United States Patent
Ergin et al.

(10) Patent No.: US 11,831,663 B2
(45) Date of Patent: Nov. 28, 2023

(54) SECURE NETWORKING PROTOCOL OPTIMIZATION VIA NIC HARDWARE OFFLOADING

(71) Applicant: Intel Corporation, Santa Clara, CA (US)

(72) Inventors: Mesut Ergin, Portland, OR (US); Ping Yu, Shanghai (CN); Declan Doherty, Clondalkin (IE); Yuwei Zhang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 901 days.

(21) Appl. No.: 16/599,051

(22) Filed: Oct. 10, 2019

(65) Prior Publication Data

US 2020/0059485 A1 Feb. 20, 2020

(51) Int. Cl.
| | |
|---|---|
| *H04L 29/06* | (2006.01) |
| *H04L 9/40* | (2022.01) |
| *H04L 49/90* | (2022.01) |
| *H04L 47/2483* | (2022.01) |
| *H04L 49/20* | (2022.01) |
| *H04L 47/2441* | (2022.01) |

(52) U.S. Cl.
CPC ...... *H04L 63/1425* (2013.01); *H04L 47/2441* (2013.01); *H04L 47/2483* (2013.01); *H04L 49/20* (2013.01); *H04L 49/9068* (2013.01); *H04L 49/9089* (2013.01); *H04L 63/1441* (2013.01); *H04L 63/20* (2013.01)

(58) Field of Classification Search
CPC ............. H04L 63/1425; H04L 47/2441; H04L 47/2483; H04L 49/20; H04L 49/9068; H04L 49/9089; H04L 63/1441; H04L 63/20; H04L 63/0492; H04L 63/0227; H04L 51/212

See application file for complete search history.

(56) References Cited

U.S. PATENT DOCUMENTS

| | | | | |
|---|---|---|---|---|
| 2013/0219171 | A1* | 8/2013 | Gearhart | H04L 63/0485 713/153 |
| 2013/0254766 | A1* | 9/2013 | Zuo | H04L 49/70 718/1 |
| 2018/0349291 | A1* | 12/2018 | Klingauf | G06F 12/12 |
| 2019/0044866 | A1* | 2/2019 | Chilikin | H04L 69/22 |

* cited by examiner

*Primary Examiner* — Evans Desrosiers
(74) *Attorney, Agent, or Firm* — Compass IP Law PC

(57) ABSTRACT

Methods and apparatus for secure networking protocol optimization via NIC hardware offloading. Under a method, security offload entries are cached in a flow table or a security database offload table on a network interface coupled to a host that implements a host security database mapping flows to Security Association (SA) contexts. Each security offload entry includes information identify a flow and information, such as an offset value, to locate a corresponding entry for the flow in the host security database. Hardware descriptors for received packets that belong to flows with matching security offload entries are generated and marked with the information used to locate the corresponding entries in the host security database. The hardware descriptors are processed by software on the host and the location information is used to de-reference the location of applicable entries in the host security database.

24 Claims, 15 Drawing Sheets

SECURE NETWORKING PROTOCOL OPTIMIZATION VIA NIC HARDWARE OFFLOADING

BACKGROUND INFORMATION

Secure networking protocols, such as IPsec (Internet Protocol security), are widely deployed in the Internet and frequently used to establish overlay and virtual private networks (VPNs) in a protected manner. IPsec specifically includes security mechanisms that facilitate secure datagram authentication and encryption within IP. These mechanisms allow creation of a boundary between unprotected and protected network interfaces, for a host or a network. Traffic flows that will utilize IPSec need to be affiliated with a Security Association (SA) context, which is a one-way abstract connection for which all required security parameters are recorded in databases, such as Security Policy Database (SPD) and/or the Security Association Database (SAD). Incoming and outgoing flows are looked-up against this database to determine the disposition of all IP traffic inbound or outbound from a host or security gateway, as well as to identify encryption parameters that are associated with each such connection.

As the number of flows subject to IPsec processing increases, the number of entries in such databases grows, thus the required time to search for the right entry for a given packet increases drastically. This lookup operation is in the critical path of packet processing, hence it affects the overall system performance and scalability. To address this, search algorithm optimizations have been used to optimize lookups in software, such as caching and hash tables. However, these improvements can at best help reduce the algorithmic time complexity of search operation from O(N) to O(log N) at the expense of more memory usage. While offloading encryption and decryption functionalities of IPsec to hardware blocks outside the CPU, such as Network Interface Cards (NIC), has been explored by many, the SA establishment and lookup processes remained mostly within CPU and relied on software algorithm optimizations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1A:
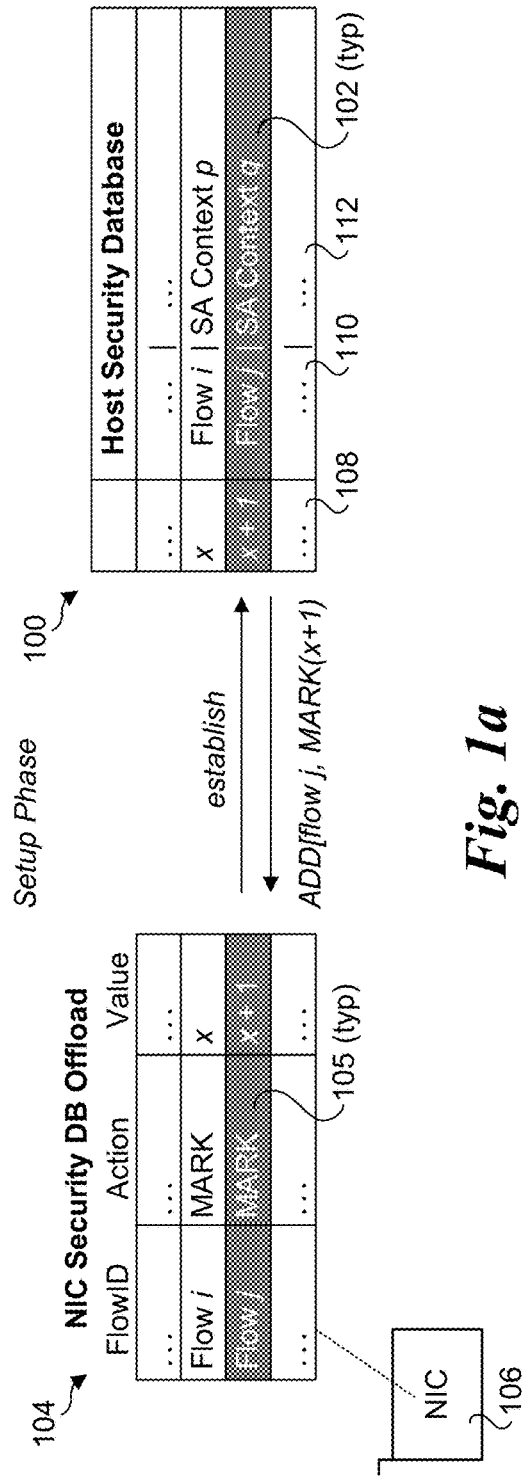
FIG. 1a is a diagram illustrating an embodiment of a setup phase under which security offload entries derived from security entries in a host security database (DB) are added to a NIC security DB offload table.

Embodiments of methods and apparatus for secure networking protocol optimization via NIC hardware offloading are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Modern NICs have capabilities designed to perform fast lookup operations on network packets against flow tables, intended for packet classification applications. In accordance with aspects embodiments disclosed here, similar capabilities are utilized to accelerate the lookup of entries from security databases, such as SPD and SAD for IPsec. When a flow is affiliated with a security context (e.g., SA of an IP flow for IPsec) and a policy, the NIC hardware can be notified of the affiliation by means of choosing and programming to the NIC a flow marker (e.g., MARK) that uniquely identifies and/or may be used to locate the entry in the security database. Once programmed, the NIC can then start to affix the packets belonging to the same flow with the appropriate MARK, reducing the process of lookup in the CPU to a simple de-referencing of MARK to an index into the database.

During the establishment of a secure channel, the pertaining flow information (e.g., n-tuples, hash of n-tuples or surrogate FlowID that identifies any particular flow of interest) and the corresponding security context (crypto keys, policies, etc.) will be recorded in one or more databases. In legacy operation, incoming and outgoing packets will be looked up against these databases, based on the n-tuples in the packet (or based on an n-tuple hash or surrogate FlowID), to determine the correct security actions to apply. In accordance with aspects of the embodiments herein, the setup phase of the security context is augmented to program the NIC to tag the packets matching the same n-tuples information (e.g., belonging to the flow for which the security context is set up), using location information that may be used to de-reference an index of the entry with that security context in the security database as a MARK value and return or identify the address of the entry in memory. If this flow needs to be looked up in multiple tables, the MARK can be constructed as a composite key to multiple tables. Software abstractions to program NICs from multiple vendors for MARK functionality can be utilized for the purpose, such as "rte_flow" library from Data Plane Development Kit (DPDK), an open source packet processing software project.

In addition to DPDK implementations, other SDN (Software Defined Network) and/or data plane software may be used. For example, embodiments may be implemented using Linaro's OpenDataPlane software and SDN software employing the OpenFlow communications protocol.

An abstracted example of the setup phase is shown in FIG. 1a, which depicts a host security database 100 with multiple security entries 102 and a NIC security database (DB) MARK table 104 with multiple security offload entries 105 stored on a NIC 106. Each of the security entries 102 in security database 100 is depicted as including an offset 108, a FlowID 110, and a Security Association (SA) context 112 for illustrative purposes; in practice, the values depicted in offset 108 are implied and represent that offset value from the memory address in which host security database 100 is stored in host memory on a host or otherwise the offset can be de-references as a row index for the security entry in host security database 100. Each of the security offload entries 105 in NIC security DB offload table 104 includes a FlowID, an Action, and a Value. During the setup phase, when a new flow is established via software running on the host a corresponding security entry is added to host security database 100, such as depicted by the entry 102 at offset x+1. In conjunction, a corresponding security offload entry 105 is added to NIC security DB offload table 104, with the same FlowID, a MARK Action, and a Value having the same offset as the security entry 102 in host security database 100.

When a packet from the NIC arrives with a MARK value present in the NIC hardware descriptor, the security software on the host CPU bypasses the full lookup process and simply returns the security database entry indexed by the MARK value, and continues the packet processing as usual. If the MARK value is designed to index into multiple security databases, the software simply deconstructs multiple indexes out of the MARK value first, and then indexes into appropriate tables to realize multiple lookups at once. The net result is the conventional software lookup operation (of the host security DB) is offloaded to the NIC hardware, removing software lookup from the critical path and reducing the lookup time complexity to O(1), implying that lookup operation would take a constant time, independent of the total number of entries in the host security database.

Figure 1B:
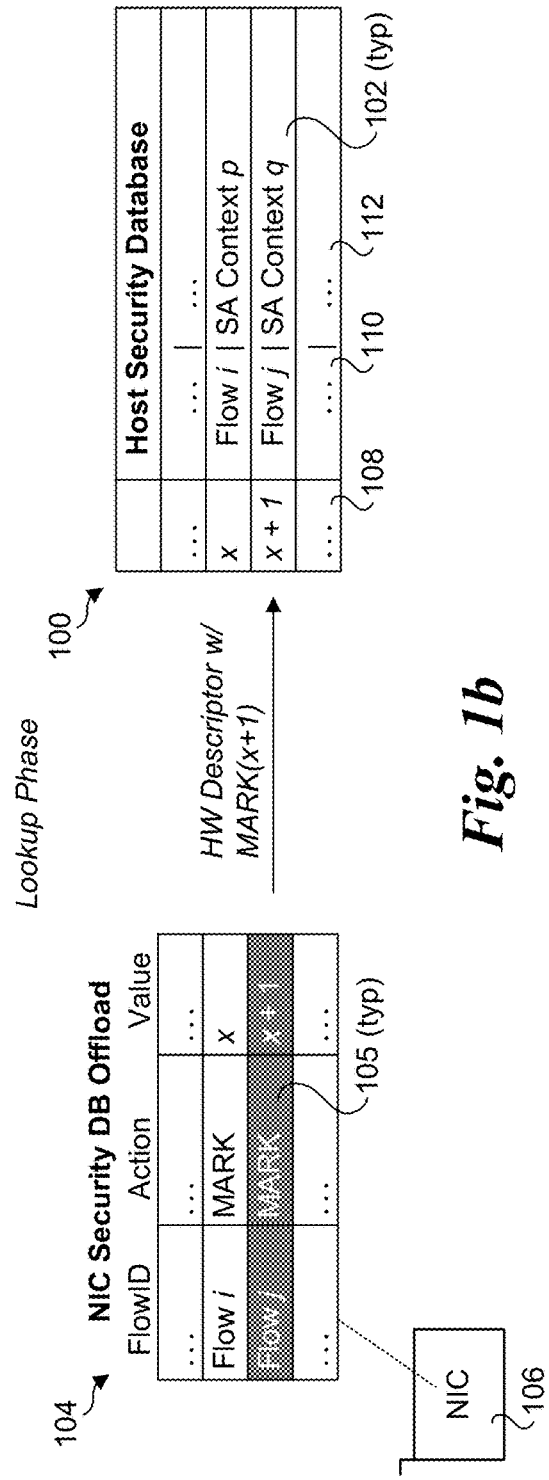
FIG. 1b is a diagram illustrating an embodiment of a lookup phase under which information in a security offload entry is used to MARK a hardware descriptor with an offset value used to de-reference a location of a corresponding secure entry in the host security database.

FIG. 1b shows an abstracted example of the lookup phase. In this instance, packet processing has been performed on NIC 106 to identify or match a FlowID for the packet as Flow j. A lookup of NIC security DB offload table 104 of Flow j returns a MARK Action and an offset value of x+1. A designated field in the hardware (HW) descriptor generated for the packet by the NIC hardware is then MARKed with the value x+1, and is posted to a ring buffer on the host. Subsequently, when the HW descriptor is accessed by the host software, and the value x+1 is extracted and used as an offset to locate Flow j in host security database 100. The SA context q is then applied to the packet.

Figure 1C:
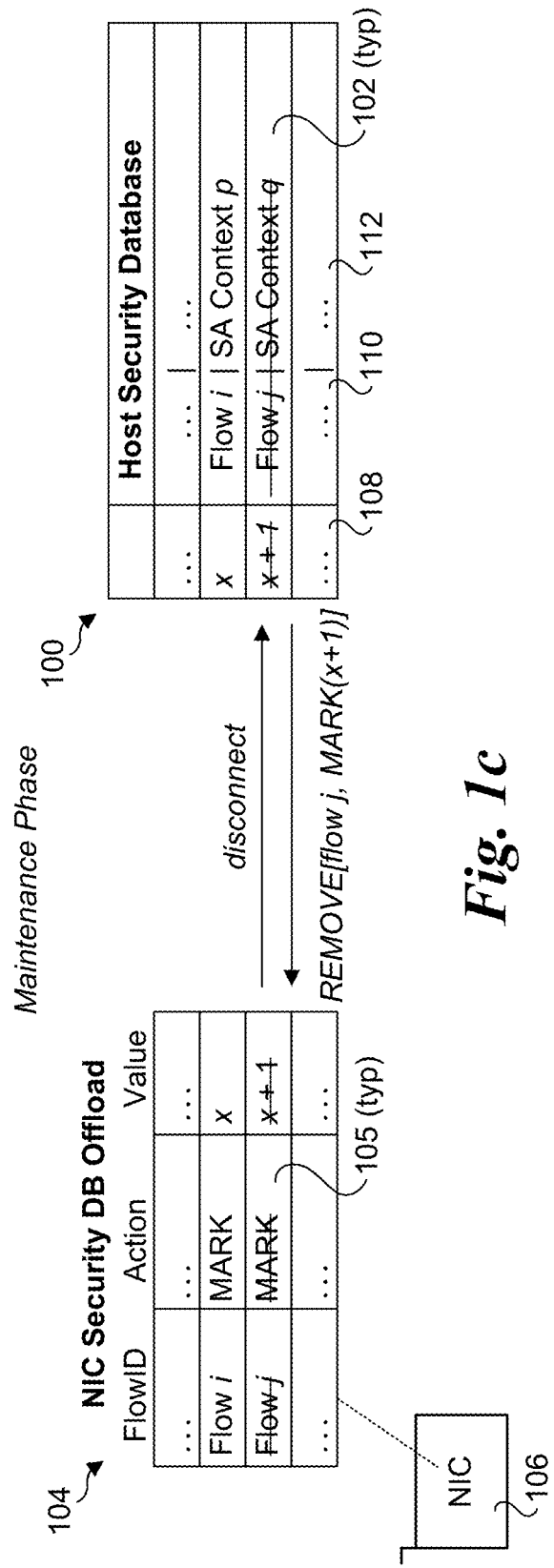
FIG. 1c is a diagram illustrating an embodiment of a maintenance phase under which entries corresponding to a flow that is no longer being used are removed from the NIC security DB offload table and the host security database.

When the secure channel and the associated security database entries are no longer valid, the software needs to maintain the correctness of lookup offload and update the NIC hardware to remove the stale flow and MARK information, making the table entry (and the corresponding MARK value) available for a new entry in the future. An abstracted example of this is shown as a maintenance phase in FIG. 1c. In this example, the software running on the host has determined that Flow j has terminated and thus its security context no longer is valid (or otherwise no longer needs to be kept for other reasons). Flow j's corresponding entry is effectively removed from host security database 100, marking the security entry 102 at offset x+1 as invalid and available for replacement by a valid future entry. The software then (through an MMIO (Memory Mapped Input Output) write in one embodiment) marks the security offload entry 105 for Flow j in NIC security DB offload table 104 as invalid and available for replacement by a valid future entry. This effectively invalidates the lookup offload functionality for Flow j, as depicted in FIG. 1c.

Figure 2:
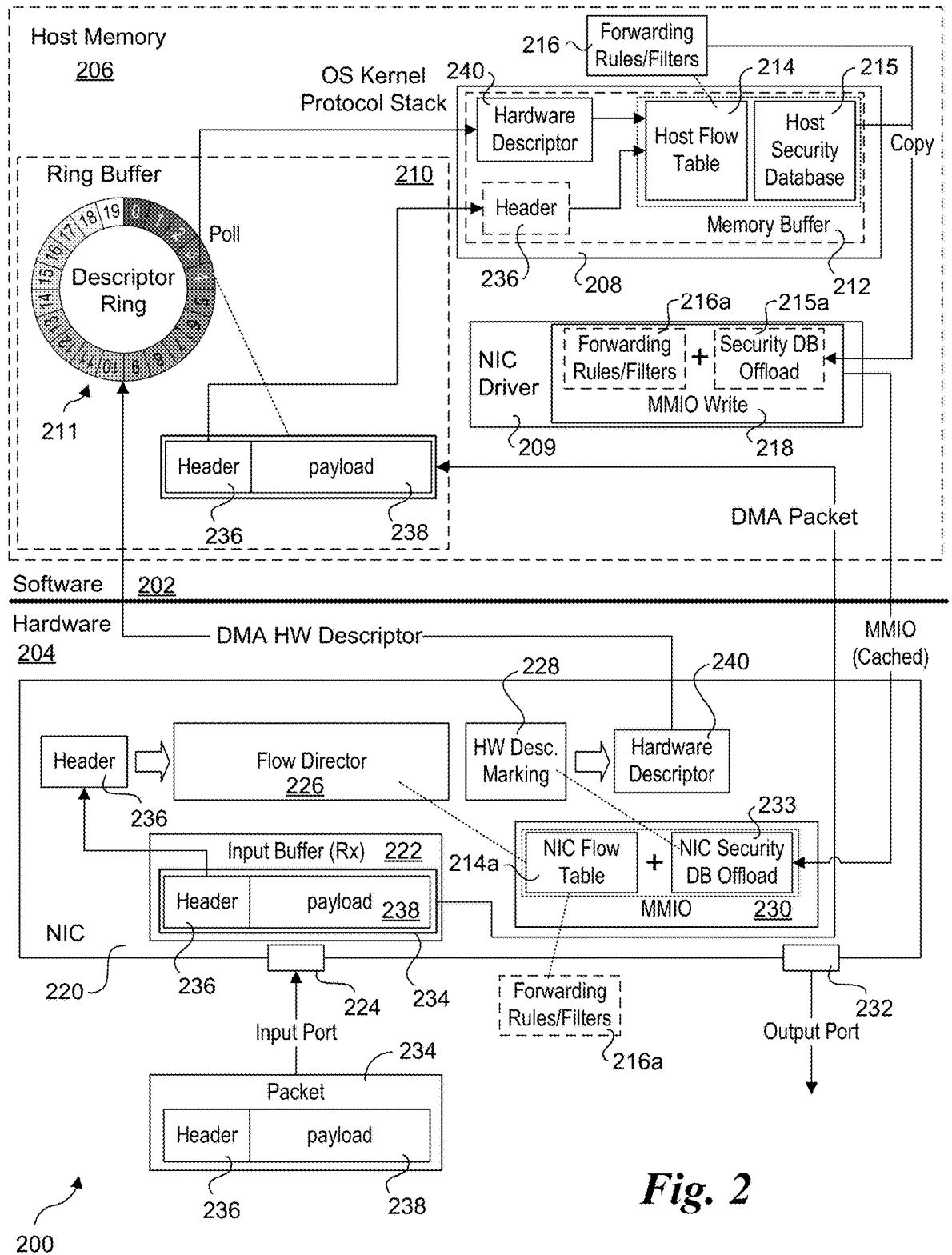
FIG. 2 is a schematic diagram illustrating a system architecture that may be used to implement aspects of the embodiments described herein.

FIG. 2 shows a system architecture 200 that may be used to implement aspects of the embodiments described herein. System architecture 200 is logically partitioned into a software layer 202 and a hardware layer 204. Software layer 202 includes host memory 206 in which various software components are loaded prior to execution, such as during booting of a host platform and/or during ongoing runtime operations. Host memory 206 is also used to store data structures associated with the software and buffer various data, such as packet data. Some of the other components include operating system (OS) software blocks, including an OS kernel protocol stack 208 and a NIC driver 209.

Figure 7:
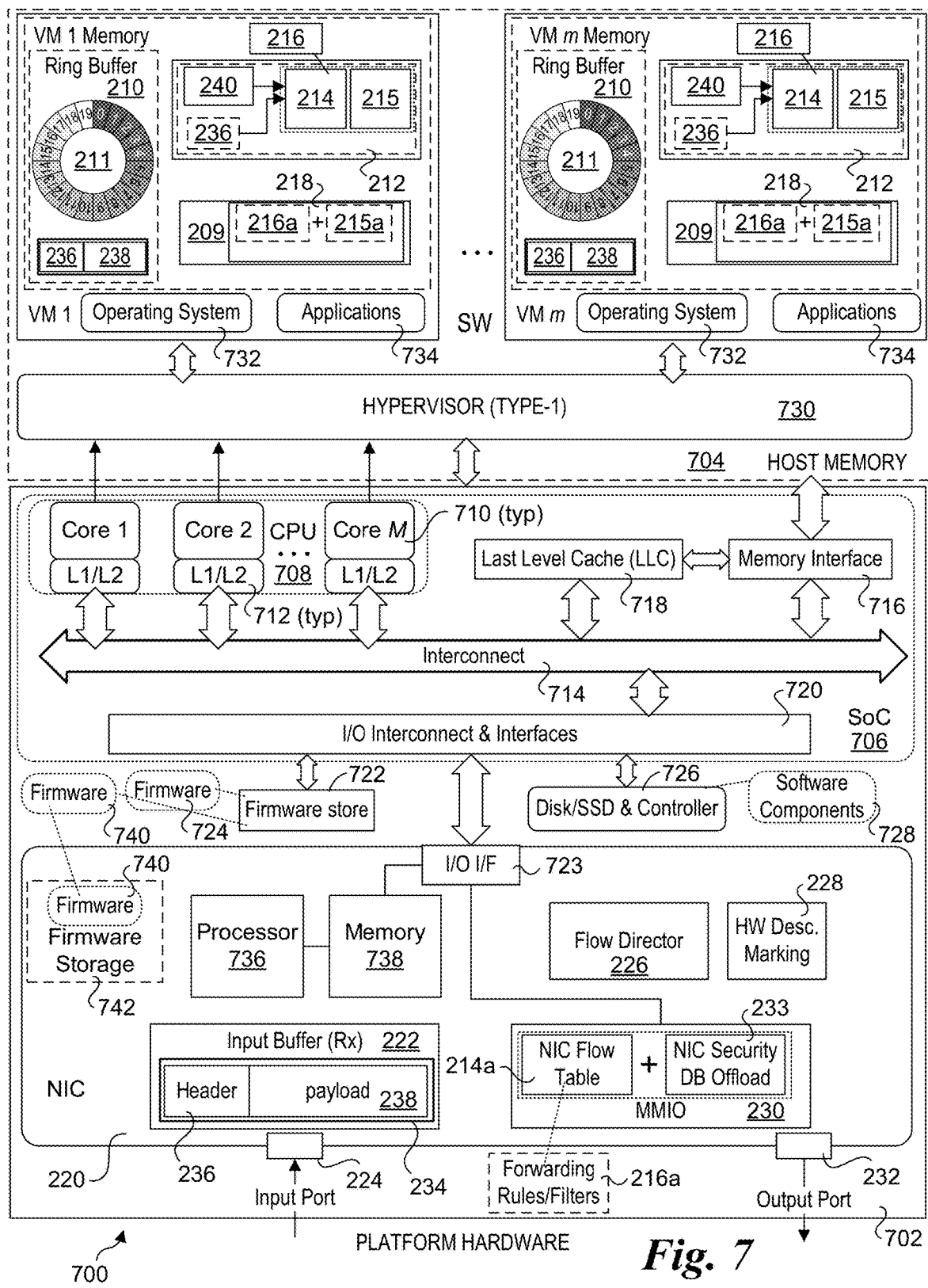
FIG. 7 is a schematic diagram of a platform architecture configured to host a plurality of virtual machines in which aspects of the embodiments described herein may be implemented.

OS kernel protocol stack 208 includes a software network stack that comprises various components for implementing software processing of Open System Interconnection (OSI) reference Layer 3 and above, as well as implementing various security-related packet processing operations, such as IPsec protocol processing operations. Under one non-limiting approach implemented by Linux OS, the kernel device driver for a NIC maps the hardware descriptor ring in the NIC hardware, to a portion 210 of host memory 206, via MMIO access, to facilitate further communication between NIC hardware and NIC device driver over these hardware descriptors. Each ring buffer holds a number of hardware descriptors, carrying metadata about a particular packet and memory pointers to the actual packet header and packet payload information in ring buffer 210. As illustrated in architecture 200, ring buffer 210 includes a descriptor ring 211 whose operation is described below. Typically, for every packet queue it maintains, the NIC device requires one transmit ring buffer for sending packets out of the system, and one receive ring buffer for accepting packets into the system from the network. Under a virtualized embodiment, separate ring buffers and descriptor rings may be allocated for separate OS instances running on virtual machines (VMs) or in containers in a similar manner illustrated in FIG. 2 and described herein. One non-limiting example of a virtualized embodiment is illustrated in FIG. 7 and described below.

OS kernel protocol stack 208 includes a memory buffer 212 in which a host flow table 214 and a host security database 215 are stored. Host flow table 214 includes a set of forwarding rules and filters 216 that are used to for various operations described herein, including packet/flow classification, forwarding, and other actions. In one embodiment, host security database 215 includes a structure that is similar to host security database 100 described above. Optionally, data in host security database 215 may be combined with data in host flow table 214.

In the embodiment illustrated in system architecture 200, NIC driver 209 includes a Memory-Mapped Input-Output (MMIO) write block 218 that is used write information to communicate the selected entries of the host flow table 214 to be cached in a NIC flow table 214a on a NIC 220 in hardware layer 204 In addition, MMIO write block 218 may also be used to cache entries from the security database offload data 215a as security offload entries in a NIC 220 security DB offload table 233. Optionally, the security offload entries may be cached in a NIC flow table that is configured with columns to support security offload entries.

NIC 220 is generally representative of a network hardware device that is used for performing hardware-based packet-processing operations associated with receiving packets from and transmitting packets to one or more networks to which ports on the NIC are connected. NIC 220 includes an input buffer 222 coupled to an input port 224. Although only a single input port 224 is shown, a NIC may include multiple input ports 224, each coupled to a respective input buffer 222. NIC 220 further includes a flow director block 226, a hardware descriptor marking block 228, MMIO address space 230, and one or more output ports 232. During ongoing operations, selected entries from host flow table 214 are cached in a NIC flow table 214a via MMIO address space 230. In one embodiment, the selected entries are written to MMIO address space 230 via MMIO write block 218 in NIC driver 209. Optionally, another software component (not shown) may be used to write selected entries from host flow table 214 into NIC flow table 214a via MMIO block 230. As another option, the selected flow table entries are written to a portal address in MMIO address space 230, read from the portal address by logic on NIC 220, and cached in NIC flow table 214a. In addition, during ongoing operations, security database offload data 215a for selected security entries in host security database 215 are written to NIC security database offload table 233 on NIC 220 or written to a portal address in MMIO address space 230.

Figure 3A:
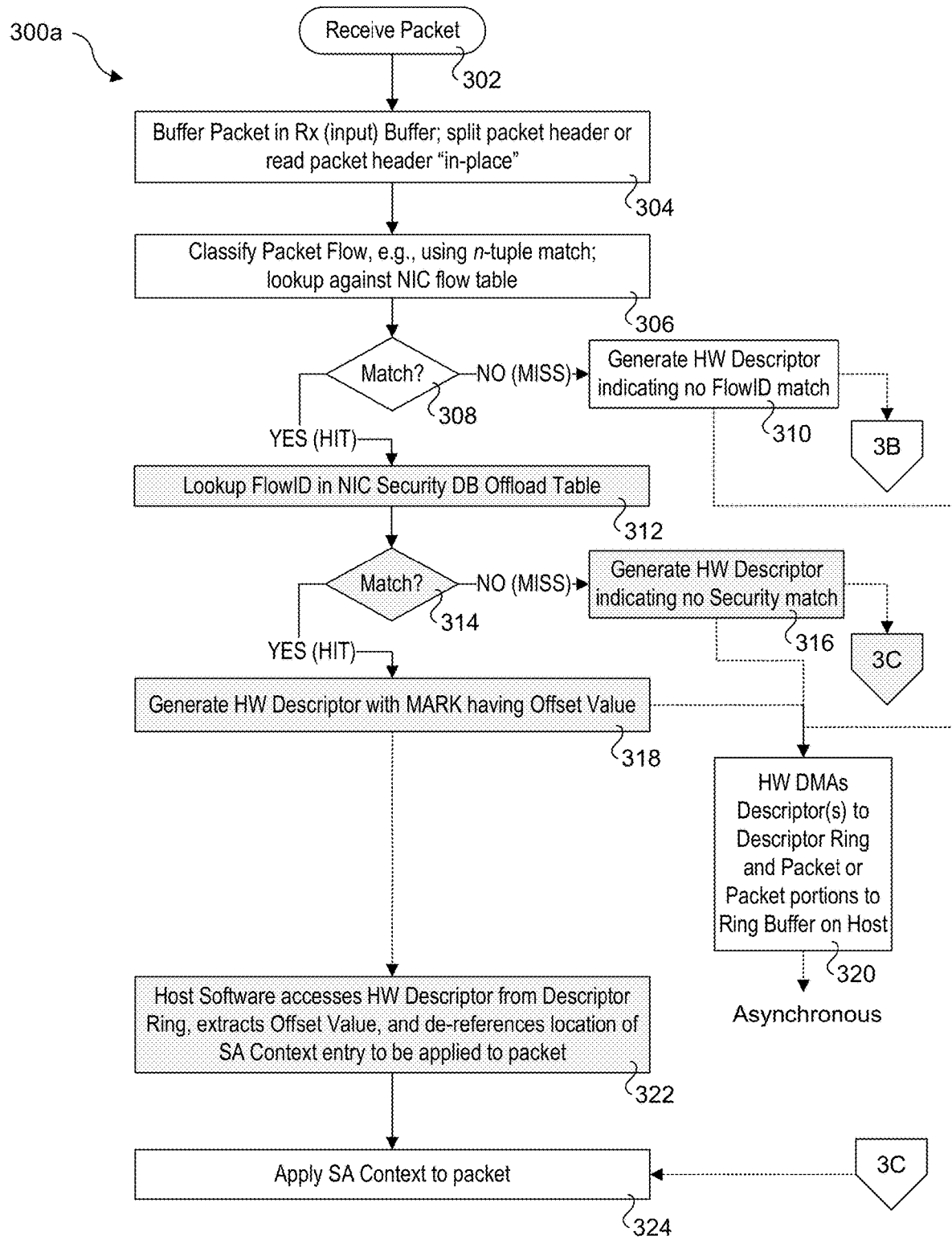
FIG. 3a is a first flowchart illustrating operation and logic performed by the hardware and software layers of the system architecture of FIG. 2 during processing of a received packet, according to one embodiment.

With reference to flowchart 300a, 300b, and 300c of respective FIGS. 3a, 3b, and 3c, operations associated with processing a packet under system architecture 200 proceed as follows. Flowcharts 300a, 300b, and 300c correspond to operation for a configuration that uses separate NIC flow and security DB offload tables. Those skilled in the networking arts will recognize that operations and logic may be modified to implement a NIC flow table in which security offload entries are stored (without use of a separate NIC security DB offload table).

As shown in a start block 302 and a block 304 of flowchart 300a, a packet 234 comprising a header 236 and packet payload 238 is received from a network at input port 224 and is buffered in input buffer 222. Depending on the implementation, the packet header and payload may be split or the header can be read "in-place." Many modern NICs, including NICs manufactured by Intel® Corporation, support a feature under which packet headers may be extracted from received packets and separated from the packet payload data on the NIC itself. For example, for a TCP/IP packet, the TCP and IP packet headers may be separated from the packet payload. Optionally, packets may be processed "in place" without separating the packet header from the payload, or otherwise the packets may be copied from the receive buffer and buffered in another buffer (not shown) and processed that other buffer.

Packet classification is next performed in a block 306 to determine whether the packet belongs to a flow with a matching packet flow cached in NIC Flow Table 214a. As depicted in FIG. 2, applicable fields in packet header 236 are inspected and corresponding data is extracted to be used by Flow Director 226 for flow classification, as well as other operations. For example, information in the packet header (e.g., source/destination address, port and socket) can be used to identify whether the packet belongs to a previously classified flow having a corresponding entry cached in NIC flow table 214a.

In further detail, in one embodiment Flow Director 226 is configured to use filter logic and/or rules to match on multiple header fields (known as match fields) with corresponding match fields in entries in NIC flow table 214a. Under one approach, one or more filters comprising a set of rules is applied to applicable header field data, such as 5-tuple or 12-tuple data, where matching is performed at the field level. Under another approach, before verifying match at the field level, a hashing scheme is used to quickly rule out non-matching flows. In one embodiment, a hash on a concatenation of the 5-tuple or 12-tuple data is employed for a FlowID lookup in NIC flow table 214a using a hash table and associated hashfunc(key): if a hash on the 5-tuple or 12-tuple data of an incoming packet matches an existing FlowID hash, the packet is then further processed to check via field level matching to see if the flow belongs to a programmed rule; if the hash does not match then the flow does not have a corresponding entry in NIC flow table 214*a*, as described below in further detail below, and can quickly be dispositioned without costlier field level verification for a match. When the same filter rules employed by OS kernel network stack 208 in host flow table 214 are implemented in Flow Director 226, the correct rules that should be applied to these packets received by NIC 220 can be determined by the NIC 220 itself. For example, this situation is depicted by forwarding rules/filters 216 and 216*a* in FIG. 2. In embodiments employing matching fields (with, or without hashes), a similar set of matching fields may be applied at both the hardware and software levels. However, this may require significantly more memory on the hardware network device. Accordingly, in one embodiment a hashed flow lookup optimization is implemented for flow table entries in the NIC flow table. Meanwhile, the host flow table may include match fields with or without hashing optimizations, or may employ a different lookup algorithm without the match fields. In addition, the flow filtering at the host may be implemented as a sequence of flow tables.

In flowcharts 300*a*, 300*b*, and 300*c* and following description hash based flow lookup optimizations are used. However, those of skill in the art will understand that other flow matching schemes may be implemented in a similar manner, such as matching solely using n-tuple match fields.

In one embodiment, forwarding rules/filters 216*a* may comprise a portion of system memory mapped to MMIO address space 230. MMIO enables portion of a hardware device's memory to be mapped to the host's system memory address space as if the memory is on the host, enabling software components to directly access the MMIO address space via Read and Write transactions to hardware that are transparent to the software components. In one embodiment, MMIO address space allocation and access is handled by NIC device driver 209. The MMIO address space may also be employed for forwarding rules/filters 216 and/or a copy scheme may be used that maintains a shadow copy of a portion of the forwarding rules/filters 216 in the MMIO address space for forwarding rules/filters 216. Accordingly, when forwarding filters and/or rules are written for new classified flows by OS kernel protocol stack 208 into forwarding rules/filters 216, a copy of the filters and/or rules may be written into forwarding rules/filters 216*a*.

In a decision block 308 a determination is made to whether the lookup of NIC flow table 214*a* results in a match. If the answer is NO, also referred to as a "miss," the logic proceeds to a block 310 in which Flow Director 226 (or another block that is not shown) will generate a hardware descriptor 240 indicating no match was found. The logic will then proceed to flowchart 300*b* of FIG. 3*b*, which is described below.

If the answer to decision block 308 is YES, also referred to as a "hit," the logic proceeds to a block 312 in which a lookup of the flow in NIC security DB offload table 233 is performed. In the illustrated embodiment it is presumed that the Flow entries in NIC flow table 214*a* are inclusive of all the Flow entries in NIC security DB offload table 233. For example, in some embodiments the NIC flow table will have more entries than the NIC security DB offload table; thus it is possible for the NIC flow table to have a match hit while the NIC security DB offload table will have a miss for the same flow. Under an alternative scheme, either the entries in both tables share the same flows (or the same match fields if match fields are used), or the various fields in the tables are combined into a single table, e.g., a NIC flow table with extended fields containing offset and SA context data (see e.g., FIG. 6*a* below). Under these schemes, the operation of blocks 312, 314, and 316 may be skipped or otherwise aggregated with blocks 306, 308, and 310.

Returning to block 312, as indicated by a decision block 314 if the lookup results in a miss the logic proceeds to block 316 in which a hardware descriptor is generated indicating no security match (i.e., there is no security offload entry in NIC security DB offload table with a matching FlowID). The logic then proceeds to flowchart 300*c* in FIG. 3*c*, as described below. If the answer to decision block 314 is YES, the logic proceeds to a block 318 in which a hardware descriptor is generated that is MARKed with the offset value of the matching security offload entry in the NIC security DB offload table 233.

Figure 5:
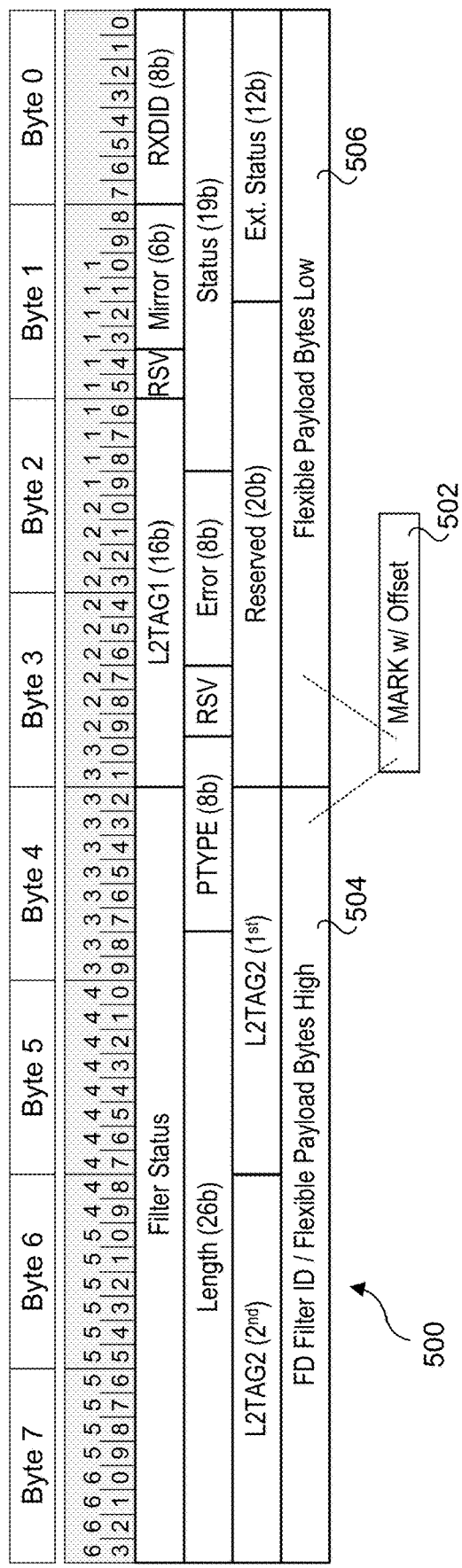
FIG. 5 is a diagram illustrating a format of an embodiment of a hardware descriptor including a MARKed offset value.

One embodiment of a hardware descriptor 500 is shown in FIG. 5. The format of hardware descriptor 500 corresponds to a 32 Byte receive descriptor with a Writeback format, representing how host software will see the hardware descriptor, as it reads it from the NIC's MMIO address space. As depicted, a MARKed Offset 502 may be written to either the 32-bit FD Filter ID/Flexible Payload Bytes High field 504 or the 32-bit Flexible Payload Bytes Low field 506, noting it need not occupy all 32-bits of the field it is written to (depending on the number of entries in the Host security database).

Depending on the determinations made in decision blocks 308 and 310, hardware descriptors with different indicia will be generated in one of blocks 310, 316, and 318, as depicted (generically) by a hardware descriptor 240 in FIG. 2. Upon generation, hardware descriptor 240 will be written to a slot in descriptor ring 211 via a DMA Write. For example, under Peripheral Component Interconnect Express (PCIe), DMA Writes and Reads may be implemented using PCIe Write and Read transactions. Substantially in parallel, a copy of packet 234 will be DMA'ed (e.g., via one or more PCIe DMA Write transactions) into ring buffer 210. These DMA writes are collectively depicted in a block 320 and may generally be performed asynchronously.

Figure 4:
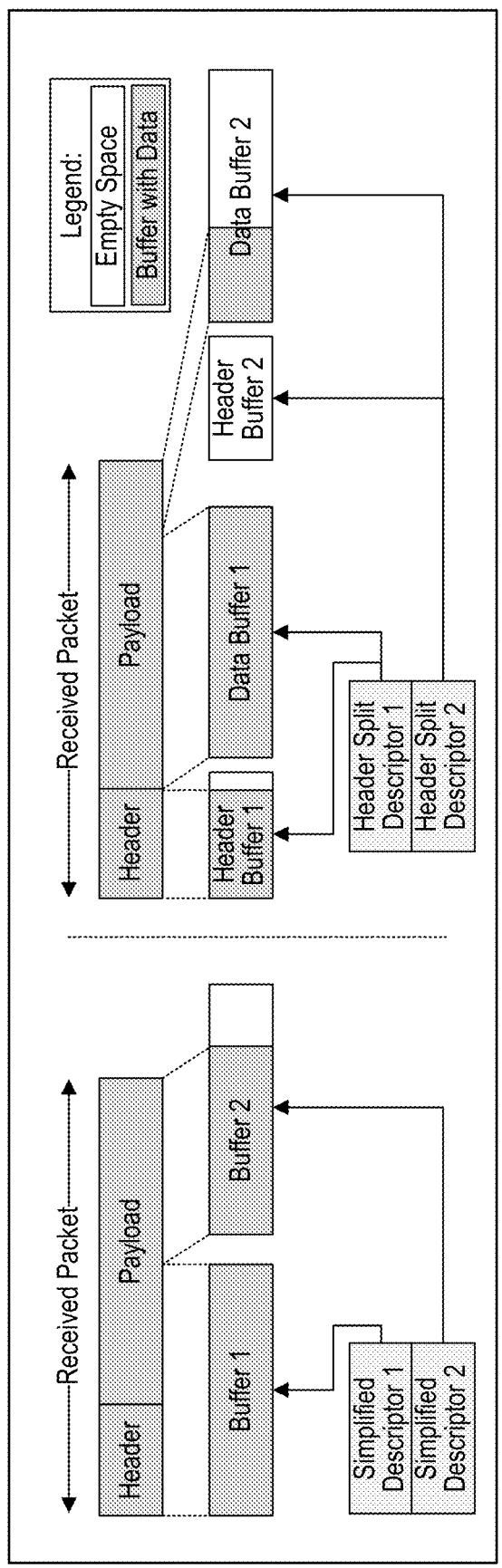
FIG. 4 is a block diagram illustrating example associations between packet data, host memory buffers, and associated hardware descriptors.

Under the scheme shown in FIG. 2, receive packets (i.e., packets received at an input port) are posted to system (host) memory buffers indicated to the hardware by hardware descriptors (also commonly referred to simply as "descriptors"). In one embodiment, the descriptors may include pointers to the data buffers and status indications of the received packets. FIG. 4 shows two examples of receive packets in host memory composed of two buffers (indicated by two matched descriptors). The scheme on the left uses simplified descriptors corresponding to an embodiment in which the packet header and payload are not split. The scheme on the right in FIG. 4 is implemented for an embodiment in which the packet header and payload are split via the hardware (e.g., split by NIC 220).

Returning to FIG. 2, in one embodiment when new descriptors are posted to descriptor ring 211 (e.g., via DMA Write transactions), NIC 220 will raise a hardware interrupt. In response, a hardware interrupt handler on the host will schedule a packet receiving software interrupt (Softirq). OS kernel protocol stack 208 then employs the Softirq to poll the ring buffer (e.g., polls for new descriptors in descriptor ring 211). Under a conventional approach, the descriptor is "pulled" off the ring and read by OS kernel protocol stack 208, which then uses the pointer in the descriptor to access the packet header (e.g., header 236 for packet 234). In connection with pulling a descriptor off descriptor ring 211, the corresponding slot may be marked as invalid (or otherwise marked as valid to receive a new descriptor), and/or a head pointer for the descriptor ring will be advanced to point to the next slot. Once the packet header is read by OS kernel protocol stack 208, higher layer processing of the packet header may be performed.

The foregoing description is abstracted for ease of understanding. In practice, various queues may be implemented on NIC 220 and in host memory 206 to facilitate the DMA transfer of descriptors and packet data (i.e., packet headers and payload).

Presuming a flow ID match or "hit" by the Flow Director or other flow classification scheme, under conventional approaches either the hardware descriptor will contain the FlowID for the packet, the packet header will be modified to include the FlowID, or some other means is implemented to associate the FlowID with the packet. Generally, the FlowID may be the original hash value (e.g., a n-tuple hash) or a surrogate flow ID associated with the original hash (or employ a similar scheme). A hash function using the n-tuple hash (or surrogate flow ID) as its key may then be used to identify the row or index of the matching entry. For embodiments using match fields, matching is performed through a set of filters or rules at the field level to identifying a matched entry (for the packet flow) in the host flow table. As discussed above, algorithmic complexity of the search using such a match field scheme is O(log N), which results in significant latency in the critical path as N (the number of flows) becomes large. For example, a modern system may support more than hundreds of thousands of flows, each with a corresponding entry in the host flow table at the software level (or entries in each of multiple related tables used for management of flows).

Returning to flowchart 300a, as depicted in a block 322 in connection with the software access the hardware descriptor from the descriptor ring the software will extract the MARKed offset value and de-reference the location of the security entry (e.g., the row or index of the security entry to be applied to the packet. The SA context (e.g., crypto keys, policies, etc.) for the matched security entry may then be applied to the packet in the conventional manner, as shown in a block 324.

Figure 3B:
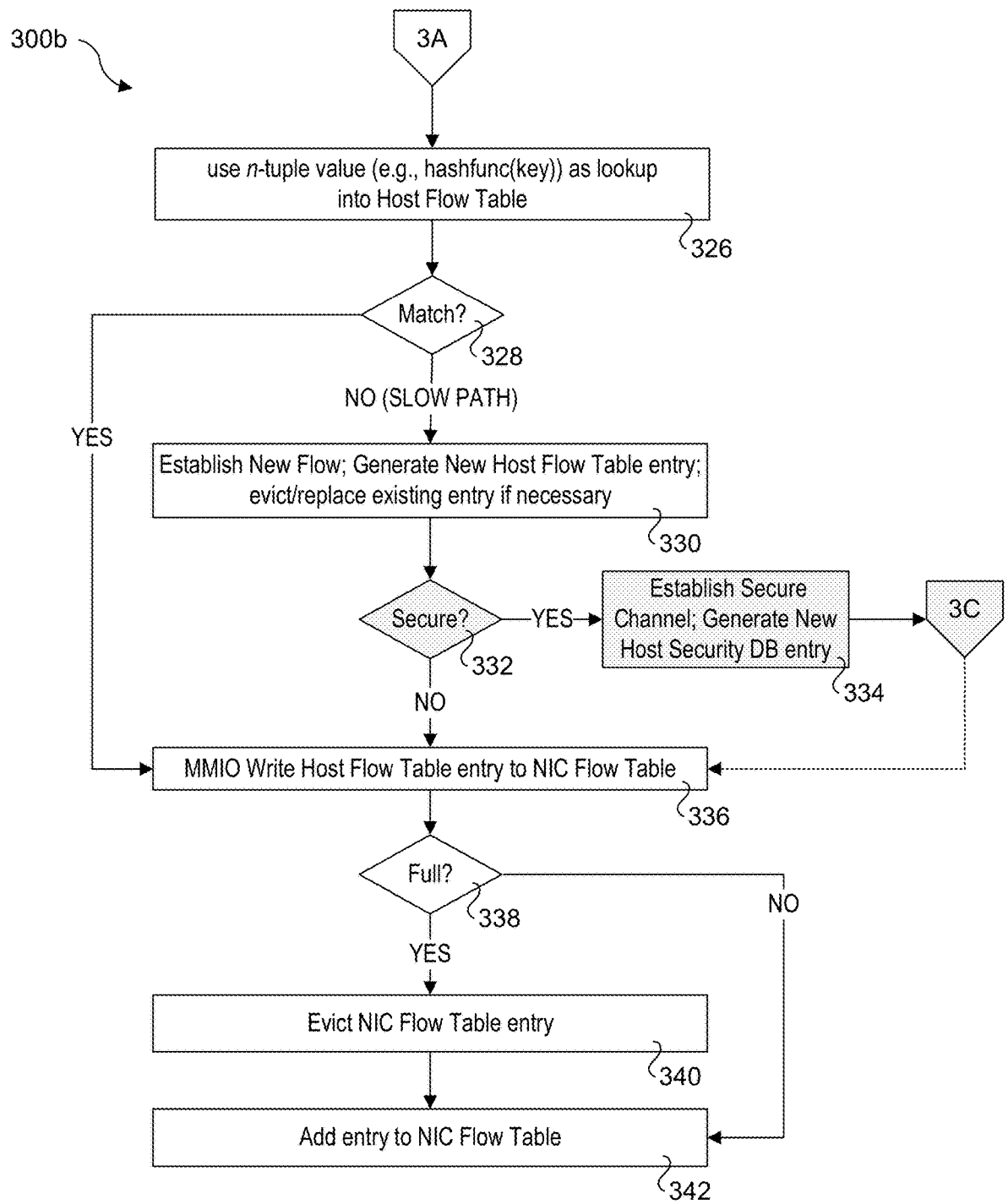
FIG. 3b is a second flowchart illustrating operation and logic performed by the hardware and software layers of the system architecture of FIG. 2 during processing of a received packet, according to one embodiment.

As discussed above, if the answer to decision block 308 is NO, there are no current entries in the NIC flow table that have an entry matching the FlowID determined by the Flow Director (or other flow classification component), a corresponding hardware descriptor is generated indicating there is no match, and the logic proceeds to flowchart 300b on FIG. 3b.

In a block 326, applicable classification rules and/or filters are employed to derive the FlowID or key that will be used as a lookup into the Host flow table. As discussed above, this may generally include use of an n-tuple hash in combination with a hash function to locate an instance of the FlowID in the Host flow table, should one exist. Optionally, a match field scheme may be used with application filters and rules. In some embodiments the same scheme will be used by both the NIC and the software (e.g., OS kernel network stack) on the host for consistency.

A determination of whether the FlowID lookup results in a match is made in a decision block 328. Since the size of the Host flow table may be much larger that the size of the NIC flow table, the likelihood of a match is much greater, particularly for previously classified flows. However, if the packet corresponds to a new flow (e.g., the packet is a first packet received for the flow), then there will be no corresponding FlowID in the Host flow table. Alternatively, and depending on the implementation, previously classified flows may be periodically evicted from the Host flow table, in which case the lookup would also result in a miss.

If a match is not found, the logic will proceed to a block 330 in which software will be used to establish a new flow as part of a "slow-path" processing. This will include generating a new Host flow table entry, which may involve evicting and replacing an existing entry if the size of the Host flow table is limited and the table is full.

If the flow is to be applied security processing, as depicted by a decision block 322, a secure channel will be established, and a new security entry will be generated and added to Host security database in the manner illustrated in flowchart 300c of FIG. 3. As indicated by the entry point 3B, this process will begin at a block 348 in which a secure channel will be established. As discussed above, during the establishment of a secure channel, the pertaining flow information (e.g., n-tuples or a hash over n-tuples) and the corresponding security context (crypto keys, policies, etc.) will be recorded in one or more databases. For simplicity and ease of explanation, only a single security database (Host security database 215) is illustrated herein.

Figure 6:
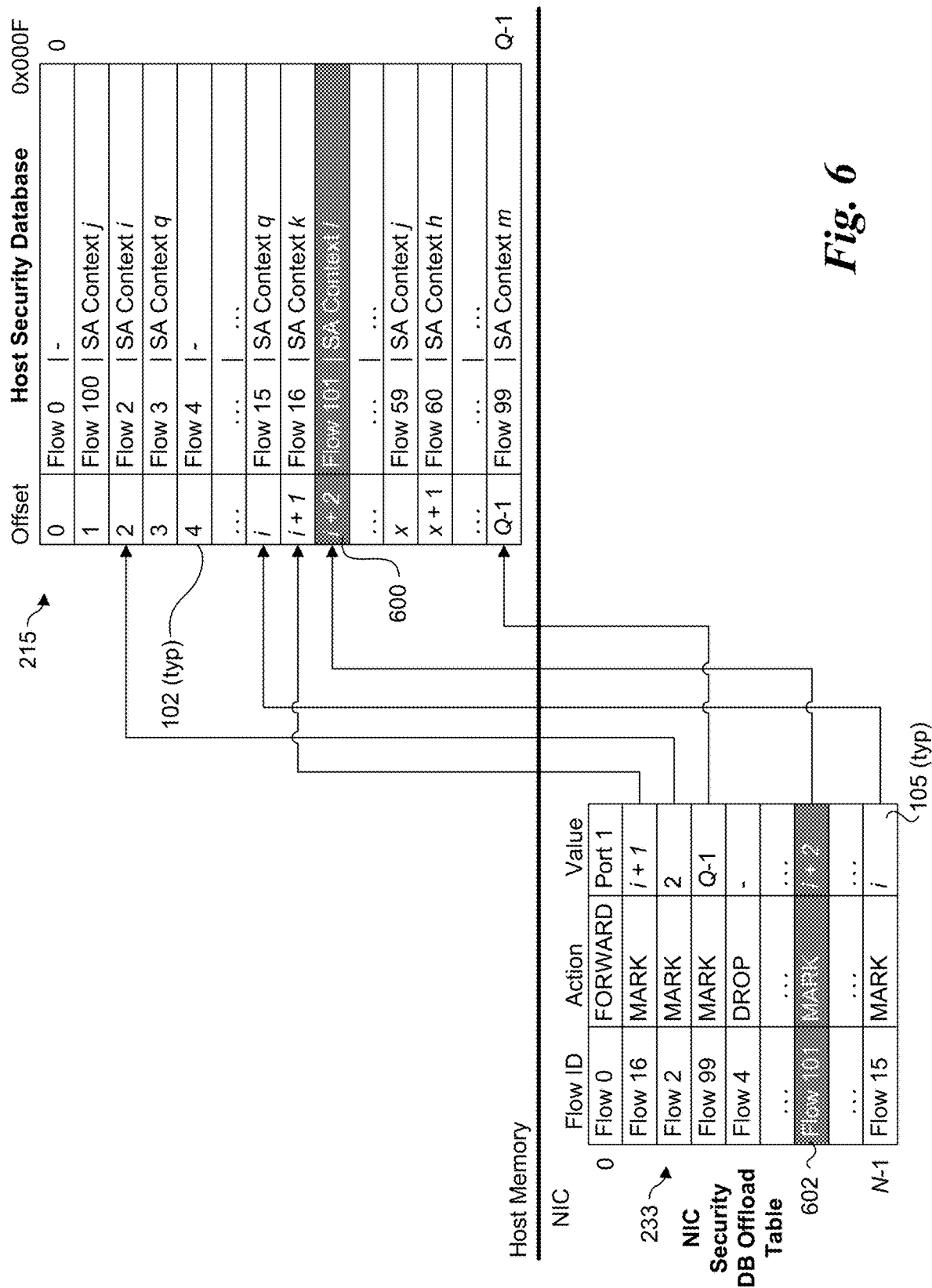
FIG. 6 is a schematic diagram illustrating exemplary configurations of a NIC security DB offload table and a host security database, according to one embodiment.

Exemplary configurations of Host security database 215 and NIC security DB offload table 233 are shown in shown in FIG. 6. Host security database 215 include Q entries 102, each having a respective offset from the beginning of the table, which for illustrative purposes has an address of 0x000F. In this example, Q=100; in practice, Q would be much larger (e.g., upwards of hundreds of thousands of entries). For illustrative purposes, Host security database 215 shows an Offset column with integer values incrementing by 1 as you move down the table structure. In practice, the offsets will be implied based on the row or index of each entry and will be a function of the size of each entry. For example, for an 8-Byte entry, the offset would be the integer value multiplied by 8 Bytes, which again would be implied and not explicitly included in the security entry. In one embodiment, each security entry 102 will have the format discussed above in FIGS. 1a, 1b, and 1c, depicted as a FlowID and an SA Context. In practice, the SA context value may be a pointer to another data structure in which parameters for the SA context (e.g., crypto keys, policies, etc.) are stored.

Also, for illustrative purposes, the FlowIDs in Host security database 215 are shown in numerical order, with examples of eviction and replacement for row 1 (FlowID 1 has been replaced with FlowID 100), and row i+2 (FlowID 17 has been replaced with FlowID 101). In practice the FlowIDs may be hashkey values (as discussed above), which would have a somewhat random ordering based on hash function used for the table. For example, under a simple scheme a hashfunc(key) function uses a modulo operator where the modulo is the number of rows in the table. However, more sophisticated schemes may be used, including schemes that address hashkey collisions. For very large tables, Cuckoo hashing may be used for Host flow tables and/or Host security database tables in some embodiments. As further illustrated in FIG. 6, FlowID 101 is depicted as a new entry 600 that has been added to Host security database 215 as a result of operations performed in block 348 in FIG. 3c.

Returning to FIG. 3c, in conjunction with adding a new security entry to Host security database 215, a corresponding new security offload entry will be written to NIC security DB offload table 233 in a block 350, as further depicted in blocks 352, 354, and 356.

NIC security DB offload table 233 operates as a type of cache associated with Host security database 215, but rather than caching identical entries in both tables, Flow entries 105 and associated Actions and Offset information are cached to accelerate lookup of the SA context for associated flows in Host security database 215.

As shown in FIG. 6, NIC security DB offload table 233 includes N security entries, where N=16. Generally, N will be much smaller than Q. As NIC security DB offload table 233 operates as a cache, the storage of entries in this table will not use a hashkeys for lookup based on the n-tuples of packets. Rather, conventional cache mechanisms may be employed, such as used by processor caches and the like. For example, a TCAM (ternary content-addressable memory) may be used in some embodiments. Alternatively, a crypto accelerator may be used to accelerator lookup of entries. Since the size of N will be relatively small and NIC security DB offload table 233 is implemented in hardware, the latency for looking up an entry in NIC security DB offload table 233 will be insignificant relative to other latencies relating to packet-processing operations on the platform.

Also, as NIC security DB offload table 233 operates as a cache, one or more cache eviction policies will be implemented. Under one approach, one or more existing cache eviction policies may be used, such as LRU (Least Recently Used). However, it is preferable to have a more sophisticated cache eviction policy that observes access patterns to keep entries for flows seeing higher levels of traffic. Such cache eviction policies may be implemented using heuristics and the like.

Figure 3C:
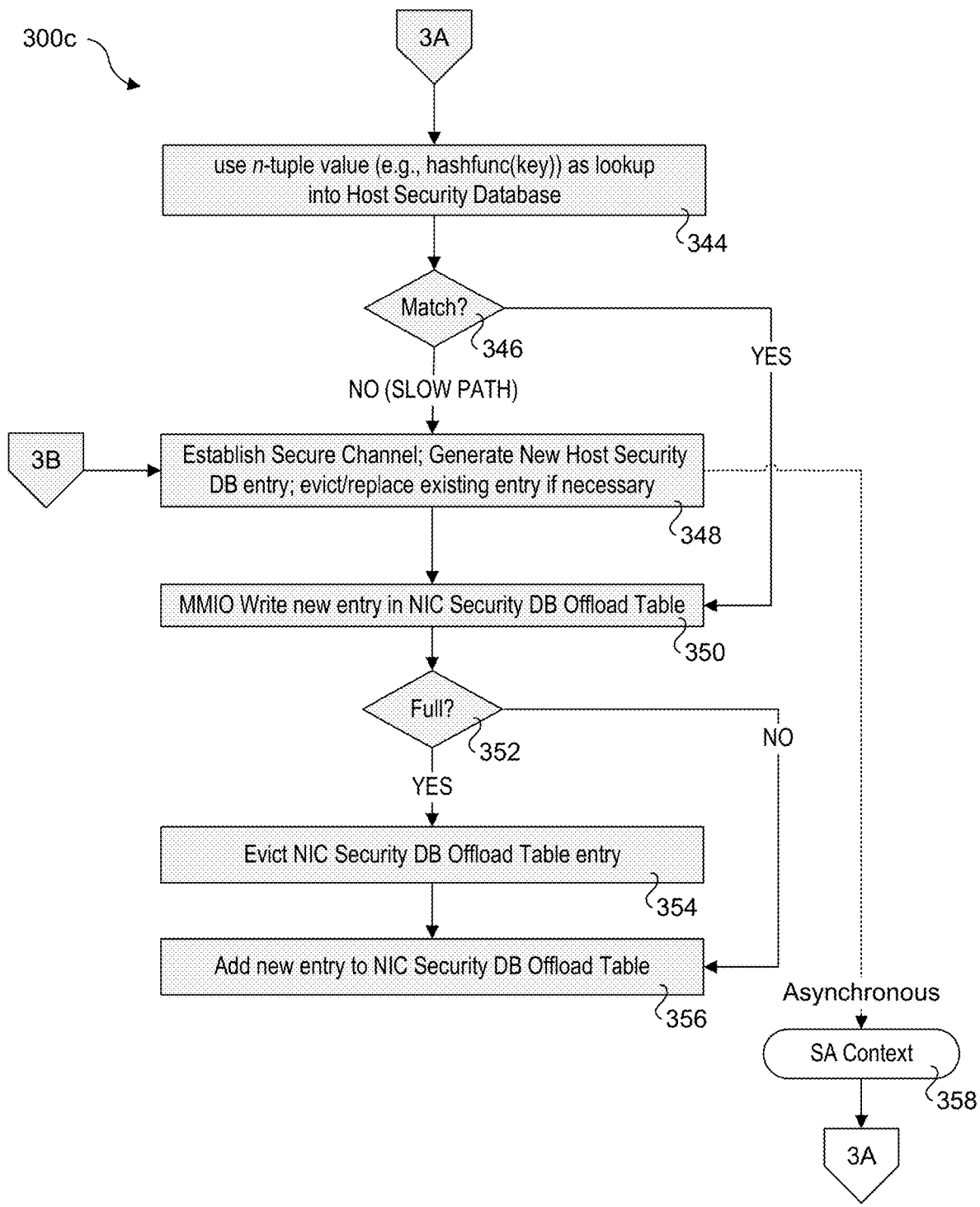
FIG. 3c is a third flowchart illustrating operation and logic performed by the hardware and software layers of the system architecture of FIG. 2 during processing of a received packet, according to one embodiment.

Returning to block 350 if FIG. 3c, under one embodiment the software will perform a MMIO write including the FlowID and the Offset values to a portal (e.g., a pre-determined address in MMIO memory space 230) on the NIC. The NIC will then read the FlowID and Offset values from the portal, generate a new security offload entry based on the FlowID and Offset values and add that new security offload entry to NIC security DB offload table 233. As shown in decision block 352, the NIC will determine first determine whether NIC security DB offload table 233 is full; generally, after a brief start-up period the answer will be YES. Accordingly, an existing entry is evicted in block 354 using an applicable cache eviction policy and the evicted entry is replaced with the new security entry in block 356, as depicted by a new security entry 602 for Flow 101. As shown, new security entry 602 include a FlowID of 101, a MARK Action, and an Offset Value of i+2, the Offset for new entry 600. A corresponding cache access mechanism (such as a TCAM) may also be updated to reflect the location of the new entry based on its FlowID or other match criteria.

As also depicted in FIG. 3c, in conjunction with establishing a security channel, the SA context for the flow will be applied to all packets associated with the flow including the first packet. Application of the SA context is depicted in a return block 358, with the logic subsequently returning to the 3C return point in flowchart 300b of FIG. 3b.

As shown in FIG. 3b, following the return from flowchart 300c or if the answer to decision block 332 is NO, the logic proceeds to a block 336 in which a MMIO write of the new Host flow table 214 entry is written to NIC flow table 214a. NIC flow table 214a also operates as a cache of the flow table entries, but in this instance the flow table entries in the Host flow table and the NIC flow table may be the same, or at least a portion of the fields in the entries are the same. As before, the software will perform a MMIO write to a portal in MMIO address space 230, logic on NIC 230 will access the information from the portal, determine if NIC flow table 214a is full in a decision block 338, evict an existing entry in a block 340 if the NIC flow table is full, and add the new entry to NIC flow table 214a in a block 342.

Generally, operations relating to Host flow table 214 and NIC flow table 214a are conventional operations that are included in flowcharts 3a and 3b for completeness. It is further noted that the operations relating to adding new entries to NIC flow table 214a and NIC security DB offload table 233 in connection with establishing new secure channels may be performed in a parallel manner.

Returning to FIG. 3a, in some instances in which separate flow and security DB offload tables are implemented in hardware, the lookup of the FlowID in the MC flow table will result in a hit, while the lookup of that same FlowID in the NIC security DB offload table will result in a miss, as depicted by a YES result for decision block 308 and a NO result for decision block 314. For example, in some embodiments the size of the NIC flow table will be larger than the size of the NIC security DB offload table or otherwise different cache evictions policies may be applied for the two tables. In this case, the HW descriptor will indicate no security match (block 316), and the logic will proceed to entry point 3A at the top of FIG. 3c. In a block 344, the n-tuple value (or otherwise the FlowID that is passed via the HW descriptor) is used as a lookup for Host security database 215. If the lookup results in a match (as indicated by a YES result for a decision block 346), the logic proceeds to block 350 to write a new entry to NIC security DB offload table 233 based on the FlowID and Offset for the matched entry in Host security database 215.

If the lookup in block 344 results in a miss, the software will employ a slow path to re-establish the security channel. For example, in implementations in which the Host security database has a fixed size requiring secured flows to be evicted (when full) and is smaller than the Host flow table, it is possible that an entry for a flow corresponding to a secure channel may be present in the Host flow table but may have been evicted from the Host security database. In that case, the secure channel for the flow will need to be re-established in block 348.

Figure 6A:
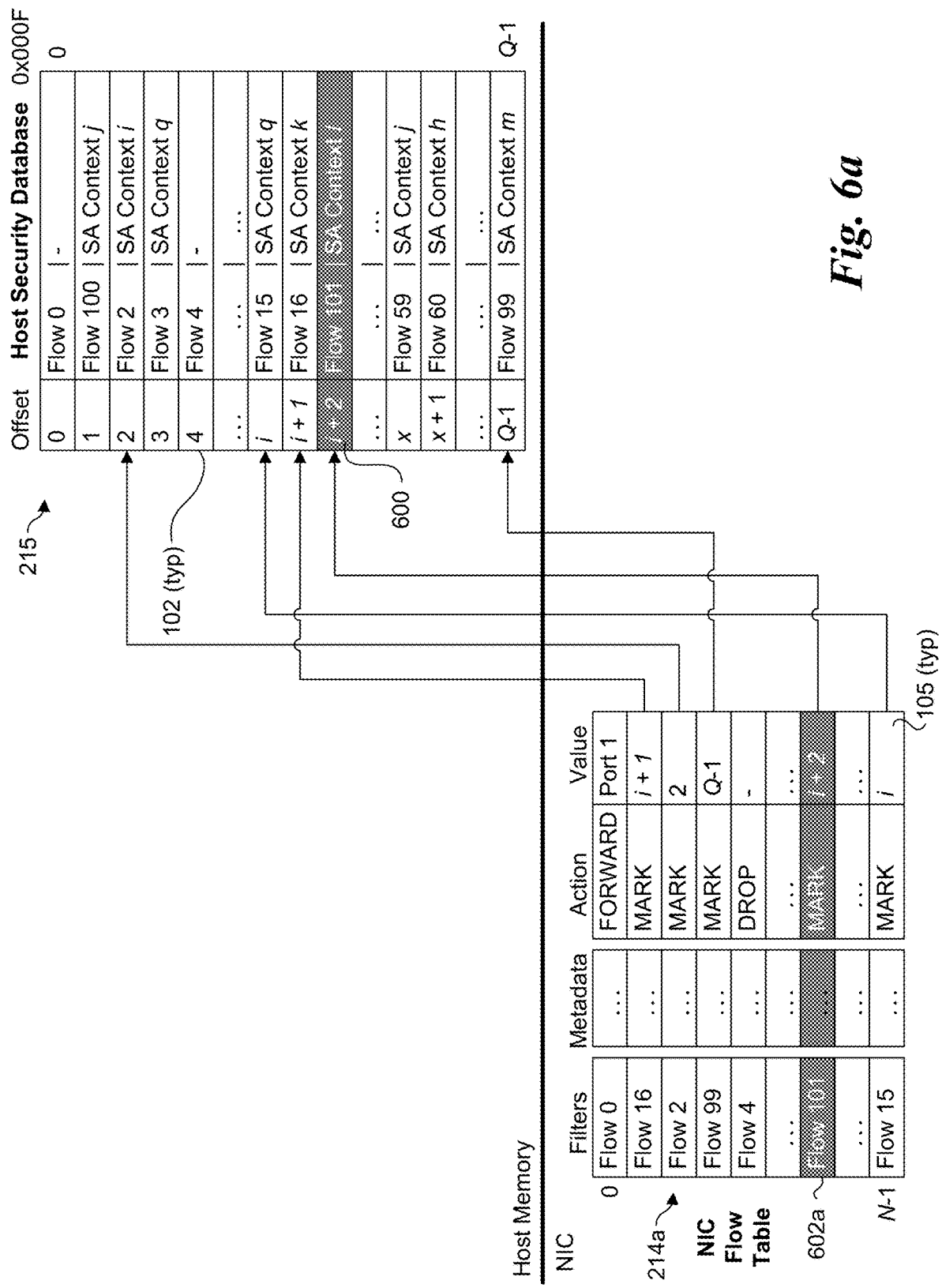
FIG. 6a is a schematic diagram illustrating exemplary configuration of a NIC flow table that includes security offload entries and a host security database, according to one embodiment.

As discussed above, in some embodiments security offload entries may be included in the flow table on the network hardware device rather than using a separate NIC security DB offload table. FIG. 6a shows an embodiment of a NIC flow table 214a that is configured to cache security offload entries. In the illustrated embodiment the table structure includes Filter fields and Metadata fields in addition to the Action and Value fields described above and illustrated in FIG. 6. Generally, either n-tuple match fields will be used for the filter fields or a FlowID comprising a hash over the n-tuple values (or other means for generating a FlowID) may be used in a similar manner described above. The Metadata fields may include one or more fields containing metadata, such as counter values. Generally, the security offload entries 602a are used in a similar manner as security offload entries 602 in FIG. 6, wherein the information in the Action and Value columns are used to MARK applicable hardware descriptors for matched security offload entries.

FIG. 7 shows one embodiment of a platform architecture 700 corresponding to a computing platform suitable for implementing aspects of the embodiments described herein. Architecture 700 includes a hardware layer in the lower portion of the diagram including platform hardware 702, and a software layer that includes software components running in host memory 704.

Platform hardware 702 includes a processor 706 having a System on a Chip (SoC) architecture including a central processing unit (CPU) 708 with M processor cores 710, each coupled to a Level 1 and Level 2 (L1/L2) cache 712. Each of the processor cores and L1/L2 caches are connected to an interconnect 714 to which each of a memory interface 716 and a Last Level Cache (LLC) 718 is coupled, forming a coherent memory domain. Memory interface is used to access host memory 704 in which various software components are loaded and run via execution of associated software instructions on processor cores 710.

Processor 706 further includes an Input/Output (I/O) interconnect hierarchy, which includes one or more levels of interconnect circuitry and interfaces that are collectively depicted as I/O interconnect & interfaces 720 for simplicity. Various components and peripheral devices are coupled to processor 706 via respective interfaces (not all separately shown), including a network controller 721 via an I/O interface 723, a firmware storage device 722 in which firmware 724 is stored, and a disk drive or solid state disk (SSD) with controller 726 in which software components 728 are stored. Optionally, all or a portion of the software components used to implement the software aspects of embodiments herein may be loaded over a network (not shown) accessed, e.g., by network controller 721. In one embodiment, firmware 724 comprises a BIOS (Basic Input Output System) portion and additional firmware components configured in accordance with the Universal Extensible Firmware Interface (UEFI) architecture.

During platform initialization, various portions of firmware 724 (not separately shown) are loaded into host memory 704, along with various software components. In architecture 700 of FIG. 7 the software components include a Type-1 hypervisor 730, also known as a "bare-metal" hypervisor. Optionally, a Type-2 hypervisor may be used (not shown). One of the primary differences between a Type-1 hypervisor and a Type-2 hypervisor is the Type-2 hypervisor is implemented as an application running on host operating system, while in a Type-1 hypervisor the hypervisor runs directly on the platform hardware without a host operating system (i.e., it runs on the "bare metal" of the platform, hence the name).

Under platform architecture 700, each of m virtual machines (VMs) VM 1 . . . VM m includes an operating system 732 and applications 434. Each VM is further configured to implement the software components and associated functionality illustrated in software layer 202 in FIG. 2 described above in the respective memory spaces allocated to the VMs (e.g., the portion of host memory 704 allocated to each VM). Platform architecture employing containers, such as Docker-type containers, may be implemented in a similar manner. In addition, computing platforms that only run a single instance of an operating system may also be used.

In FIG. 7, a portion of the circuitry and logic for implementing the hardware layer functionality of 2 and flowcharts 3a-3c described above includes a processor 736, coupled to memory 738, and firmware 740 that is executed on processor 736. Generally, firmware 740 may be stored on-board network controller 721, such as in a firmware storage device 742, or loaded from another firmware storage device on the platform external to network controller 721 during pre-boot, such as from firmware store 722.

Figure 7A:
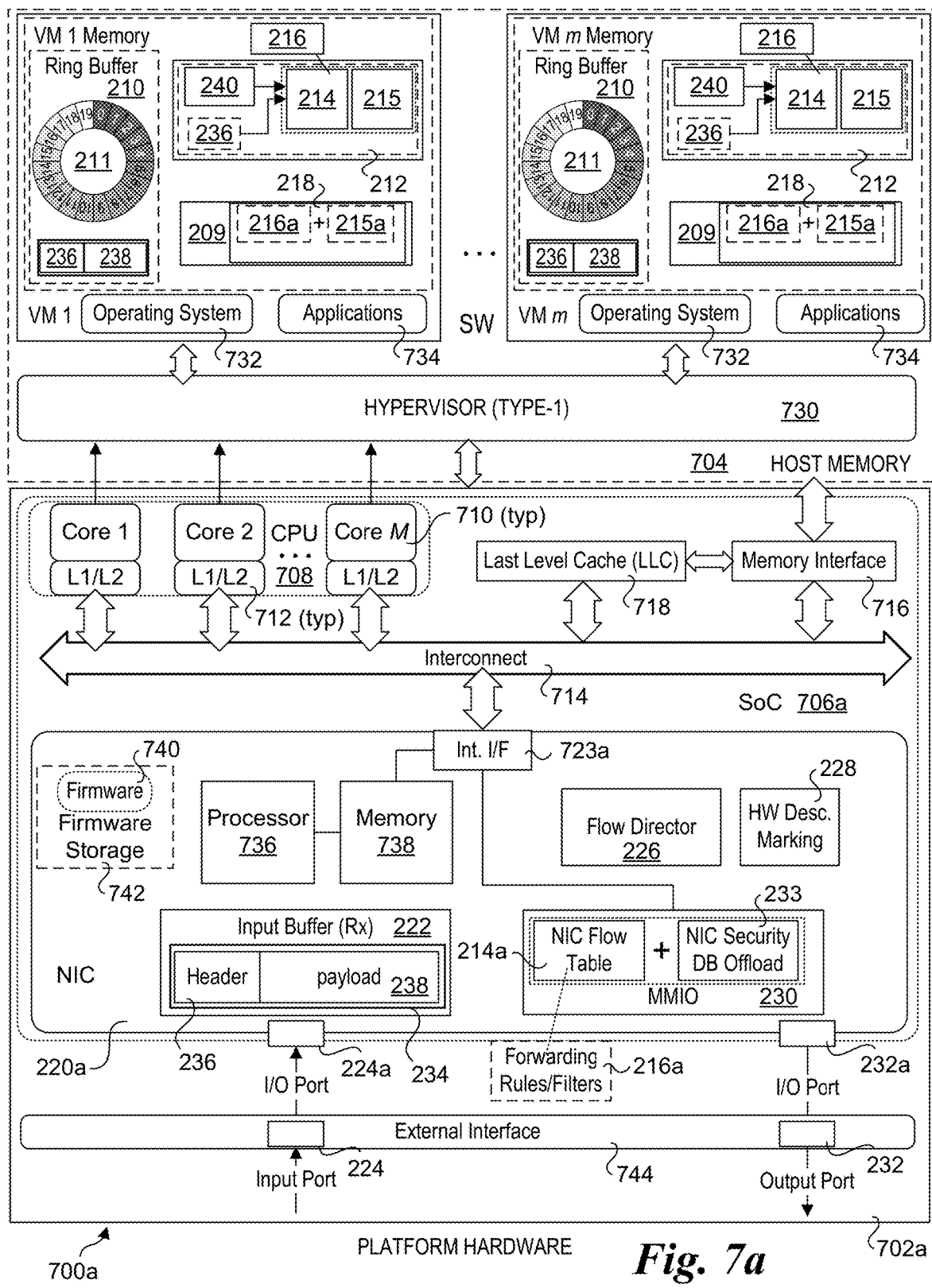
FIG. 7a is a schematic diagram of a platform architecture similar to that shown in FIG. 7 in which the NIC is integrated in the SoC.

FIG. 7a shows a platform architecture 700a including an SoC 706a having an integrated NIC 220a configured in a similar manner to NIC 220 in platform architecture 700, with the following differences. Since NIC 220a is integrated in the SoC it includes an internal interface 723a coupled to interconnect 714 or another interconnect level in an interconnect hierarchy (not shown). Input port 224 and output port 232 are physical ports in an external interface 744 that are respectively coupled to I/O ports 224a and 232a on SoC 706a. In one embodiment, SoC 706a further includes I/O interconnect and interfaces and platform hardware includes firmware, a firmware store, disk/SSD and controller and software components similar to those shown in platform architecture 700 but are not shown for lack of space.

The CPUs 708 in SoCs 706 and 706a may employ any suitable processor architecture in current use or developed in the future. In one embodiment, the processor architecture is an Intel® architecture (IA), including but not limited to an Intel® x86 architecture, and IA-32 architecture and an IA-64 architecture. In one embodiment, the processor architecture is an ARM®-based architecture.

Generally, the hardware devices disclosed herein may include but are not limited to network adapters, network controllers or NICs, InfiniBand HCAs, and host fabric interfaces (HFIs). Under some embodiments, the network adaptors, controllers, and NICs are configured to be implemented using one or more Ethernet protocol defined by IEEE 802.3-based protocols. Other types of protocols may also be used, as will be recognized by those having skill in the networking arts.

Figure 8:
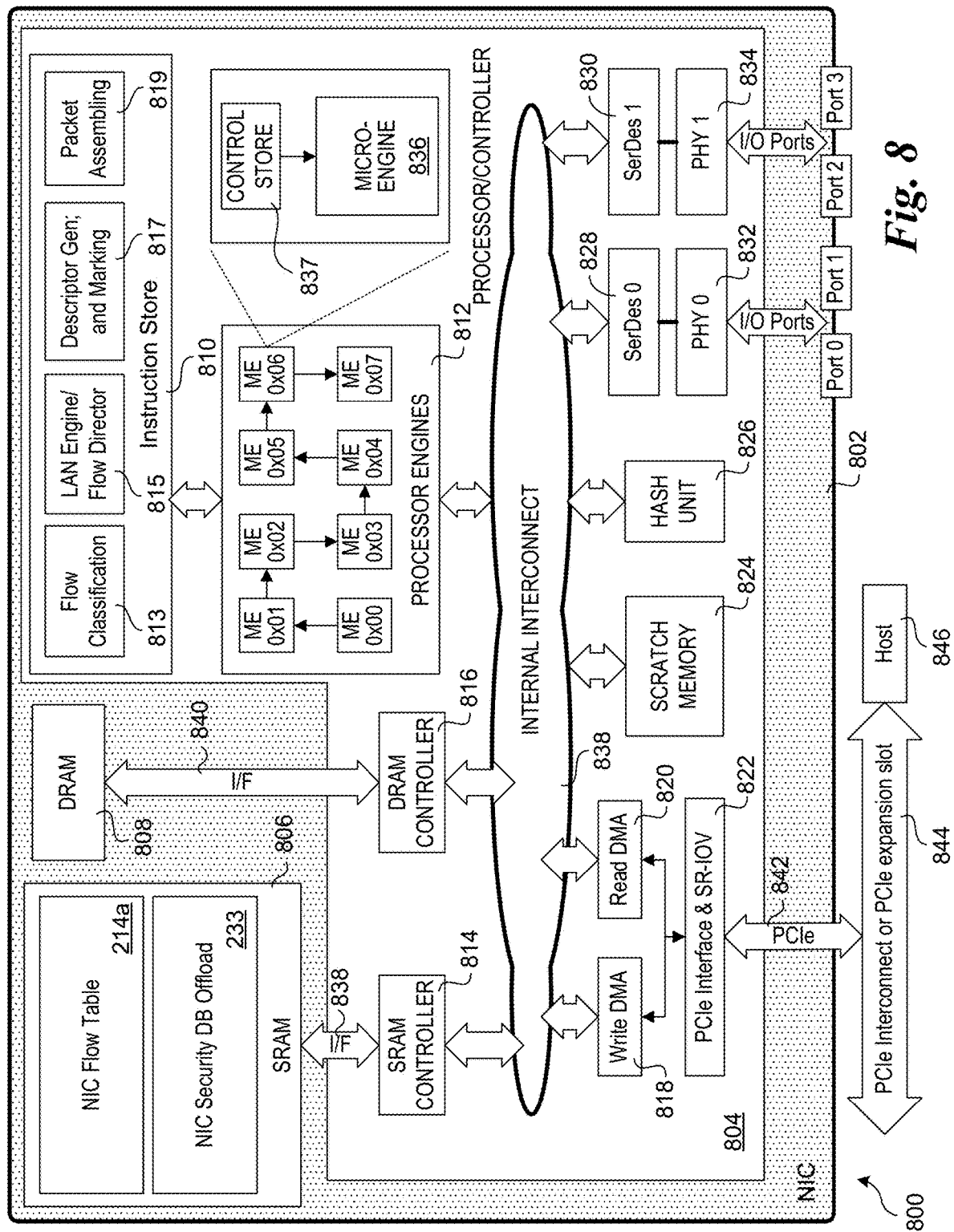
FIG. 8 is a schematic diagram illustrating an architecture for a NIC that may be used for implementing aspects of the network hardware devices disclosed herein, according to one embodiment.

An exemplary system architecture for a NIC 800 is shown in FIG. 8. NIC 800 includes a NIC system board 802 on which a network processor/controller 804 and memory including Static Random Access Memory (SRAM) 806 and Dynamic Random Access Memory (DRAM) 808 and are mounted. Under various embodiments. NIC system board 802 is representative of an Ethernet controller card, a daughter board, a multi-chip module board or substrate, or it may be part of a computer system board, such as a main board or motherboard for a computer server. Processor/controller 804 is representative of Ethernet processing and/or control unit, and may be embodied in various forms, including as an Ethernet controller chip or a network processor unit (NPU).

In the illustrated embodiment, processor/controller 804 includes an instruction store 810, a cluster of processor engines 812, an SRAM controller 814, a DRAM controller 816, a Write DMA block 818, a Read DMA block 820, a PCIe interface 822, a scratch memory 824, a hash unit 826, Serializer/Deserializers (SerDes) 828 and 830, and PHY interfaces 832 and 834. Each of the components is interconnected to one or more other components via applicable interconnect structure and logic that is collectively depicted as an internal interconnect cloud 835.

Instruction store 810 includes various instructions that are executed by processor engines cluster 812, including Flow Classification instructions 813, LAN engine/Flow Dirctor instructions 815, Descriptor Generation and Marking instructions 817, and Packet Assembling instructions 819. Processor engines cluster 812 includes a plurality of microengines 836, each coupled to a local control store 837. Under one embodiment, various operations such as packet identification and flow classification are performed using a pipelined architecture, such as illustrated in FIG. 8, with each microengine performing an associated operation in the pipeline. As an alternative, processor engines cluster 836 is representative of one or more processor cores in a central processing unit or controller. As yet another option, the combination of processor engines 812 and instruction store 810 may be implemented as embedded logic, such as via a Field Programmable Gate Arrays (FPGA) or the like.

In one embodiment, instruction store 810 is implemented as an on-chip store, such as depicted in FIG. 8. Optionally, a portion or all the instructions depicted in instruction store 810 may be stored in SRAM 806 and accessed using SRAM controller 814 via an interface 838. SRAM 806 may also be used for storing selected data and/or instructions relating to packet processing operations. In the illustrated embodiment, each of NIC flow table 214a and NIC security DB offload table 233 are implemented in SRAM.

DRAM 806 is used to store one or more Input (RX) Buffers (coupled to input ports) and one or more Output Buffers (coupled to output ports), as well as for various other buffer and/or queues, and is accessed using DRAM controller 816 via an interface 840. Write DMA block 818 and Read DMA block 820 are respectively configured to support DMA Write and Read operations in accordance with the embodiments described herein. In the illustrated embodiment, DMA communication between SRAM 806 and a platform host circuitry is facilitated over PCIe interface 822 via a PCIe link 842 coupled to a PCIe interconnect or PCIe expansion slot 844, enabling DMA Write and Read transactions between SRAM 806 and system memory for a host 846 using the PCIe protocol. Portions of DRAM 808 may also be accessed via DMA Write and Read transactions. PCIe interface may operate as a PCIe endpoint supporting SR-IOV (Single-root Input-Output Virtualization) functionality under some embodiments.

In addition to PCIe, other interconnect technologies and protocols may be used. For example, these include but are not limited to Computer Express Link (CXL), InfiniBand, and Omni-Path.

Scratch memory 824 and hash unit 826 are illustrative of components employed by NICs for facilitating scratch memory and hashing operations relating to packet processing. For example, as described above a hash operation may be implemented for deriving flow IDs and for packet identification. In addition, a hash unit may be configured to support crypo-accelerator operations.

PHYs 832 and 834 facilitate Physical layer operations for the NIC, and operate as a bridge between the digital domain employed by the NIC logic and components and the analog domain employed for transmitting data via electrical, optical or wired signals. For example, in the illustrated embodiment of FIG. 8, each of PHYs 832 and 834 is coupled to a pair of I/O ports configured to send electrical signals over a wire cable such as a Cat6e or Cat6 Ethernet cable or a 100 GB Ethernet cable. Optical and wireless signal embodiments would employ additional circuitry and interfaces for facilitating connection via optical and wireless signals (not shown). In conjunction with PHY operations, SerDes 828 and 830 are used to serialize output packet streams and deserialize inbound packet streams.

In addition to the instructions shown in instruction store 810, other instructions may be implemented via execution of processor engines 812 or other processing means to facilitate additional operations. For example, in one embodiment, NIC 800 is configured to implement a TCP/IP stack on the NIC itself. NIC 800 may also be configured to facilitate TCP operations in a manner that is offloaded from the Operating System TCP facilities, whereby once a packet is sent outbound, NIC 800 is responsible for processing an ACK message and resending the packet if an ACK message is not received within an applicable TCP timeout value.

Generally, a NIC may be configured to store routing data for facilitating packet identification and flow classification, including forwarding filters and rules either locally or using a MMIO address space in system or host memory. When stored locally, this routing data may be stored in either SRAM 806 or DRAM 808. Routing data stored in a MMIO address space, such as NIC flow table 214a data may be accessed by NIC 800 via Read DMA operations. Generally, setting up MMIO address space mapping may be facilitated by a NIC device driver in coordination with the operating system. The NIC device driver may also be configured to enable instructions in instruction store 810 to be updated via the operating system. Optionally, the instructions in instruction store may comprise firmware instructions that are stored in non-volatile memory, such as Flash memory, which may either be integrated on processor/controller 804 or mounted to NIC system board 802 (not shown).

Figure 9A:
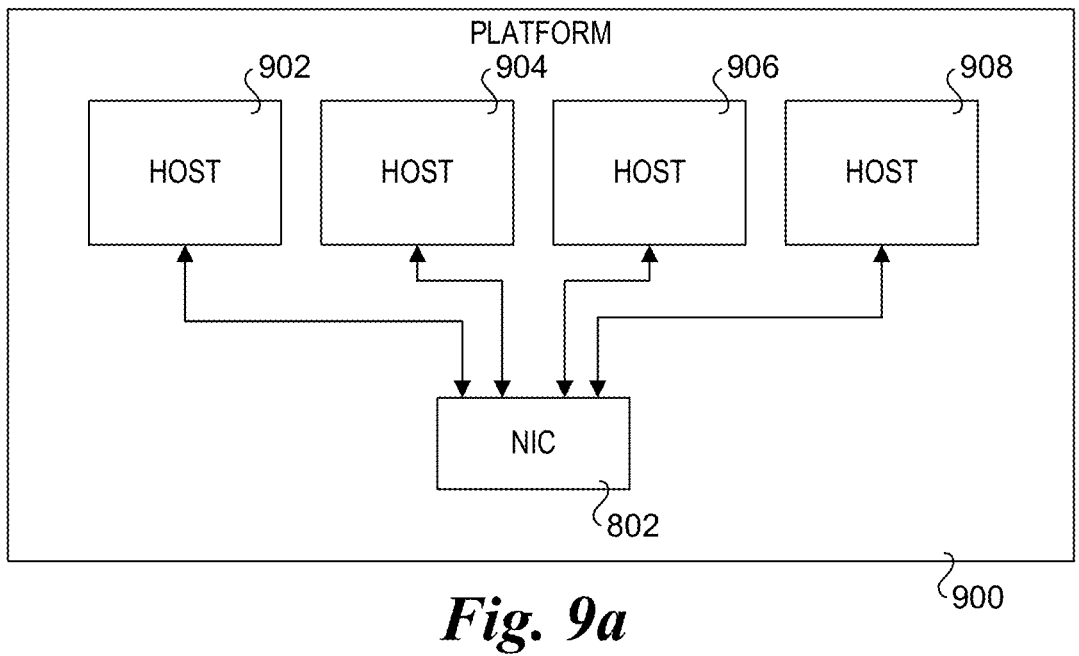
FIG. 9a is a schematic diagram illustrating a NIC coupled to a plurality of hosts in a platform.

In addition to a NIC being connected to a single host, the NIC may be connected to multiple hosts. For example, FIG. 9a shows a platform 900 including a NIC 802 connected to each of hosts 902, 904, 906, and 906. In one embodiment, when connected to multiple hosts, NIC 802 includes a separate set of NIC flow tables and NIC security DB offload tables for each host. In another embodiment, the NIC flow table and NIC security DB offload table entries for multiple hosts are combined in the same tables.

Figure 9B:
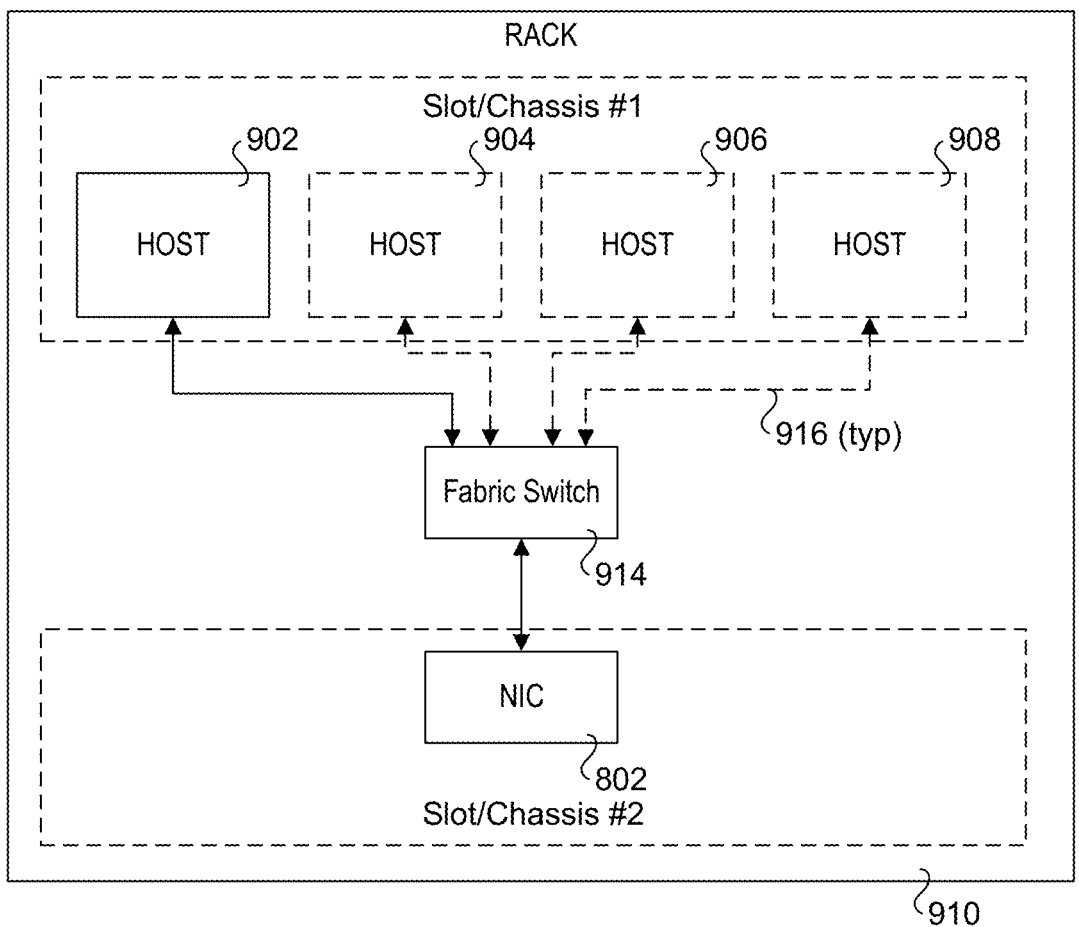
FIG. 9b is a schematic diagram illustrating a NIC in a first slot or chassis of a rack coupled in communication with one or more hosts in a second slot or chassis of the rack via a fabric.

As shown in FIG. 9b, a NIC can be installed in a rack in a slot, chassis, tray or sled that is separate from a slot, chassis, tray or sled in which one or more hosts connected to the NIC are installed. In this example, NIC 802 is installed in a slot or chassis #2 in a rack 910 including multiple slots. One or more hosts 902, 904, 906, and 908 are installed in a slot or chassis #1. NIC 802 is coupled in communication with one or more of hosts 902, 904, 906, and 908 via a fabric switch 914 and fabric links 916. In other embodiments, a NIC may be coupled in communication with a host in a separate slot or chassis via a point-to-point link. In still other embodiments, a NIC may be coupled in communication with a host in a separate rack (not shown).

Figure 10:
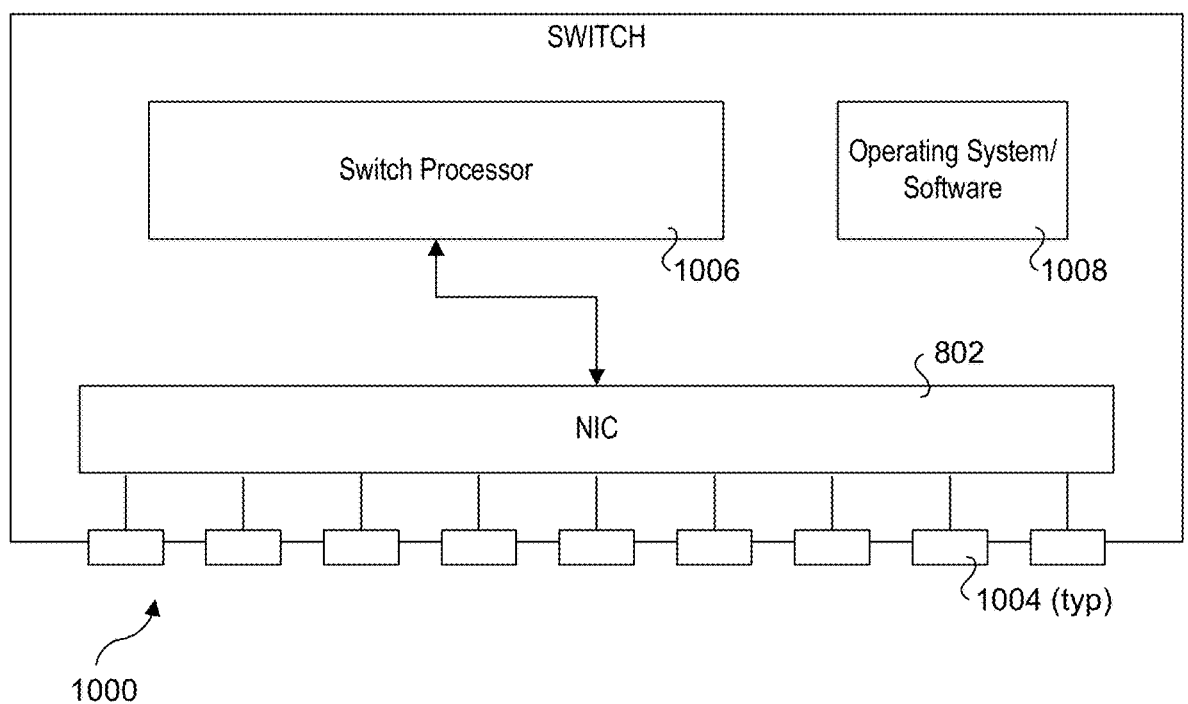
FIG. 10 is a schematic diagram illustrating implementation of a NIC in a switch.

The teachings and principles disclosed herein may also be implemented in a switch. For example, FIG. 10 shows a switch 1000 including a NIC 802 connected to multiple switch ports 1004 and to a switch processor 1006. An operating system or other software 1008 is executed on switch processor 1006 to effect operations similar to those performed by the OS kernel protocol stack (or other operating system components) in the embodiments described above.

In general, the circuitry, logic and components depicted in the figures herein may be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to Application Specific Integrated Circuits (ASICs), FPGAs, IP block libraries, or through one or more of software or firmware instructions executed on one or more processing elements including processors, processor cores, controllers, microcontrollers, microengines, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'h', 'i', 'j', 'k', 'l', 'm', 'n', 'p', 'M', 'N', 'Q', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented comprising:
receiving a first packet at a network interface coupled to a host having host memory;
performing flow classification to identify a flow the first packet belongs to;
matching a security offload entry associated with the flow;
marking a hardware descriptor with location information in the security offload entry;
caching or storing a plurality of security offload entries in a security database offload table on the network interface, each respective security offload entry including information to identify or match a respective flow in at least one of a flow table and security database in the host memory; and
implementing a flow table on the network interface.

2. The method of claim 1, wherein the host includes a host security database and each security entry in the host security database includes a Security Association (SA) context, further comprising:
processing the hardware descriptor via execution of software on the host, the processing of the hardware descriptor including,
extracting the location information of the hardware descriptor;
using the location information to de-reference an index of a security entry in the host security database; and
applying the SA context in that security entry to the first packet.

3. The method of claim 1, further comprising:
receiving, from the host, information identifying or to be used for matching a flow and location information to de-reference a location of a corresponding security entry for the flow in the host security database.

4. The method of claim 3, further comprising caching or storing a new security offload entry in the security database offload table on the network interface including the information identifying or to be used for matching the flow and the location information to de-reference a location of the corresponding security entry for the flow in the host security database.

5. The method of claim 4, wherein the security offload entry includes a flow identification (FlowID) field, an Action field, and a Value field in which a value comprising one of an offset value and an offset address from a base address at which the host security database is stored, and wherein the Action field identifies whether a hardware descriptor for a packet belonging to a flow matching the FlowID should be marked with the value in the Value field.

6. The method of claim 4, further comprising:
employing a cache eviction policy to determine an existing security offload entry to evict from the security database offload table on the network interface;
evicting the security offload entry that is determined; and
replacing the security offload entry that is evicted with the new security offload entry.

7. The method of claim 1, further comprising:
receiving a second packet at an input port of the network interface;
performing flow classification to identify a flow the second packet belongs to;
determining there is not a matching entry for the flow that is identified in at least one of the flow table and the security database offload table on the network interface; and
generating a hardware descriptor associated with the second packet containing indicia indicating there was not a matching entry for the flow to which the second packet belongs.

8. The method of claim 7, wherein the network hardware device includes a memory-mapped input-output (MMIO) address space, further comprising:
performing flow classification on the host to identify a flow the second packet belongs to or extracting information via the host to identifying the flow the second packet belongs to from the hardware descriptor;
identifying an entry in the host security database corresponding to the flow; and
writing, via the host to a memory location in the MMIO address, information identifying the flow and one of an offset value, an offset address from the base address, or a host memory address for the entry in the host security database.

9. A hardware network device comprising:
circuitry to implement a flow table and a security database offload table; and
memory to store a plurality of security offload entries in the security database offload table, each respective security offload entry including information to identify or match a respective flow and location information to locate an entry associated with the security offload entry in a host security database implemented in a host to which the hardware network device is configured to be coupled.

10. The hardware network device of claim 9, further comprising circuitry to:
receive a first packet at an input port of the network interface;
perform flow classification to identify a flow the first packet belongs to;
match a security offload entry cached or stored on the network interface associated with the flow;
generate a hardware descriptor associated with the first packet;
mark the hardware descriptor with the location information in the security offload entry that is matched.

11. The hardware network device of claim 9, further comprising circuitry to:
receive, from the host, information identifying or to be used for matching a flow and location information to de-reference a location of a corresponding security entry for the flow in the host security database; and
cache a new security offload entry in the security database offload table on the network interface including the information identifying or to be used for matching the flow and the location information to de-reference a location of the corresponding security entry for the flow in the host security database.

12. The hardware network device of claim 11, wherein the security offload entry includes a flow identification (FlowID) field, an Action field, and a Value field in which a value comprising one of an offset value, an offset address from a base address at which the host security database is stored, and wherein the Action field identifies whether a hardware descriptor for a packet belonging to a flow matching the FlowID should be marked with the value in the Value field.

13. The hardware network device of claim 11, further comprising circuitry to:

employ a cache eviction policy to determine an existing security offload entry to evict from one of the flow table or security database offload table on the interface;
evict the security offload entry that is determined; and
replace the security offload entry that is evicted with the new security offload entry.

14. The hardware network device of claim 9, further comprising circuitry to:
receive a second packet at an input port of the network interface;
perform flow classification to identify a flow the second packet belongs to;
determine there is not a matching entry for the flow that is identified in at least one of the flow table and the security database offload table; and
generate a hardware descriptor associated with the second packet containing indicia indicating there was not a matching entry for the flow to which the second packet belongs.

15. The hardware network device of claim 14, wherein the network interface includes a memory-mapped input-output (MMIO) address space, further comprising circuitry to:
receive, at a memory location in the MMIO address space, information derived from a security entry in the host security database identifying or to be used for matching a flow to which the second packet belongs and location information to de-reference a location of the security entry in the host security database.

16. The hardware network device of claim 9,
wherein the flow table and the security database offload table have different sizes.

17. A computer platform, comprising:
a processor including a plurality of cores;
host memory, communicatively coupled to the processor,
one or more storage devices in which software instructions are stored; and
a network interface, communicatively coupled to the processor via an input/output (I/O) link, the network interface including circuitry and one or more ports configured to enable the network interface to receive packets from one or more networks,
wherein the computer platform is configured, via execution of the software instructions on the processor and via the circuitry in the network interface, to,
implement a host flow table in the host memory including a plurality of flow table entries;
implement a host security database in the host memory including a plurality of security entries;
implement a flow table and a security database offload table on the network interface; and
cache or store a plurality of security offload entries in the security database offload table on the network interface, each respective security offload entry including information to identify or match a respective flow and location information to de-reference a location of a security entry associated with the respective flow in the host security database.

18. The computer platform of claim 17, wherein the circuitry in the network interface is further configured to:
receive a first packet at an input port of the network interface;
perform flow classification to identify a flow the first packet belongs to;
match a security offload entry cached on the network interface associated with the flow;
generate a hardware descriptor associated with the first packet;
mark the hardware descriptor with the location information in the security offload entry that is matched; and
write the hardware descriptor to a ring buffer in the host memory.

19. The computer platform of claim 18, wherein each entry in the host security database includes a Security Association (SA) context, wherein execution of the instructions on the host processor enables the computer platform to:
extract the location information in the hardware descriptor;
use the location information to de-reference an index of a security entry in the host security database; and
applying the SA context in that security entry to the first packet.

20. The computer platform of claim 17, wherein the circuitry in the interface is further configured to:
receive a second packet at an input port of the network interface;
perform flow classification to identify a flow the second packet belongs to;
determine there is not a matching entry for the flow that is identified in at least one of the flow table and the security database offload table; and
generate a hardware descriptor associated with the second packet containing indicia indicating there was not a matching entry for the flow to which the second packet belongs.

21. The computer platform of claim 20, wherein the network interface includes a memory-mapped input-output (MMIO) address space, and wherein execution of the instructions on the host processor enables the computer platform to:
perform flow classification on the host to identify a flow the second packet belongs to or extract information from the hardware descriptor to identifying the flow the second packet belongs to;
locate a security entry in the host security database corresponding to the flow; and
write, to a memory location in the MMIO address space, information identifying or to be used for matching the flow to which the second packet belongs and location information to de-reference a location of the security entry in the host security database.

22. A non-transitory machine-readable medium having instructions stored thereon configured to be executed by a processor in a host platform including host memory and a network interface to enable the host platform to:
implement a flow table in the host memory including a plurality of flow table entries;
implement a host security database in the host memory including a plurality of security entries;
read a hardware descriptor posted to the host memory by the network interface, the hardware descriptor associated with a packet received at the network interface;
extract location information from the hardware descriptor;
use the location information to locate a security entry in the host security database; and
apply a Security Association (SA) context defined by the security entry to the packet.

23. The non-transitory machine-readable medium of claim 22, wherein the instructions comprise instructions for one or more operating system components.

24. A non-transitory machine-readable medium of claim 22, wherein the location information comprises an offset value, and wherein execution of the instructions enables the host platform to determine an index in the host security database for the security entry using the offset value.

\* \* \* \* \*